United States Patent
Utt et al.

(10) Patent No.: US 7,352,340 B2
(45) Date of Patent: Apr. 1, 2008

(54) DISPLAY SYSTEM HAVING A THREE-DIMENSIONAL CONVEX DISPLAY SURFACE

(75) Inventors: Steven W Utt, Austin, TX (US); Philip C Rubesin, Palo Alto, CA (US); Michael A Foody, Saratoga, CA (US)

(73) Assignee: Global Imagination, Menlo Park, CA (US)

( * ) Notice: Subject to any disclaimer, the term of this patent is extended or adjusted under 35 U.S.C. 154(b) by 194 days.

(21) Appl. No.: 10/613,449

(22) Filed: Jul. 3, 2003

(65) Prior Publication Data

US 2005/0017924 A1 Jan. 27, 2005

Related U.S. Application Data

(60) Provisional application No. 60/435,973, filed on Dec. 20, 2002.

(51) Int. Cl.
G09G 3/00 (2006.01)
G03B 21/14 (2006.01)

(52) U.S. Cl. .......................................... 345/32; 353/79

(58) Field of Classification Search ................. 353/79, 353/98, 122, 74; 359/749; 352/69; 348/754; 345/32

See application file for complete search history.

(56) References Cited

U.S. PATENT DOCUMENTS

| | | | |
|---|---|---|---|
| 3,366,436 A | 1/1968 | Rickless | |
| 3,737,214 A * | 6/1973 | Shimizu | 359/749 |
| 4,070,098 A | 1/1978 | Buchroeder | |
| 4,246,603 A | 1/1981 | Wolff | |
| 4,464,029 A * | 8/1984 | Jaulmes | 352/69 |
| 4,859,053 A * | 8/1989 | Nicolas | 353/74 |
| 5,023,725 A | 6/1991 | McCutchen | |
| 5,030,100 A | 7/1991 | Hilderman | |
| 5,546,139 A * | 8/1996 | Bacs et al. | 348/754 |
| 5,703,604 A | 12/1997 | McCutchen | |
| 6,176,584 B1 | 1/2001 | Best et al. | |
| 6,183,088 B1 | 2/2001 | LoRe et al. | |
| 6,191,759 B1 | 2/2001 | Kintz | |
| 6,327,020 B1 | 12/2001 | Iwata | |
| 6,409,351 B1 * | 6/2002 | Ligon | 353/98 |
| 6,530,667 B1 * | 3/2003 | Idaszak et al. | 353/79 |
| 6,560,041 B2 * | 5/2003 | Ikeda et al. | 359/749 |
| 6,698,900 B1 * | 3/2004 | Young et al. | 353/79 |
| 6,880,939 B2 * | 4/2005 | Colucci et al. | 353/122 |
| 6,905,218 B2 * | 6/2005 | Courchesne | 353/122 |

* cited by examiner

Primary Examiner—Sumati Lefkowitz
Assistant Examiner—William L Boddie
(74) Attorney, Agent, or Firm—Fenwick & West LLP

(57) ABSTRACT

A display system has a display surface having a three-dimensional convex shape. A projection system projects an object field onto a continuous image field located on the interior of the display surface the display surface is extensive in its coverage, for example subtending an angle of at least 240 degrees to provide greater hemispherical coverage.

43 Claims, 30 Drawing Sheets

*LENS DATA

| SRF | RADIUS | THICKNESS | APERTURE RADIUS | GLASS | SPE | NOTE |
|---|---|---|---|---|---|---|
| OBJ | -- | -1.6000E+03 | 292.000000 | AIR | | |
| AST | -- | 13.000000 | 10.000000 A | AIR | | |
| 2 | -- | 4.500000 | 22.000000 | SF10 | C | |
| JML | 67891 PCV SF10 | | | | | |
| 3 | 168.260000 | 0.500000 | 22.000000 P | AIR | | |
| 4 | 122.680000 | 7.090000 | 23.240000 | BK7 | C | |
| JML | 70552 DCX BK7 | | | | | |
| 5 | -178.870000 | 94.518476 V | 23.240000 P | AIR | | |
| 6 | -- | 10.000000 | 30.000000 | CARBO | C | |
| 7 | -- | 45.913584 V | 30.000000 | AIR | * | |
| 8 | -103.950000 | 5.000000 | 37.500000 | BK7 | C | |
| Edm sci 53115 DCV 75mm dia, -100 mm fl, Th 5mm? | | | | | | |
| 9 | 103.950000 P | 13.000000 | 33.300000 | AIR | | |
| 10 | 78.000000 | 5.000000 | 37.500000 | BK7 | C | |
| Edm sci 53114 DCV 75mm dia, -75mm FL, Th 3 mm | | | | | | |
| 11 | 78.000000 P | 17.000000 | 32.800000 | AIR | | |
| 12 | -60.090000 | 10.320000 | 32.800000 | LLF1 | C | |
| JML | 64015 Neg Meniscus LLF1 | | | | | |
| 13 | -607.860000 | -32.000000 | 52.500000 | AIR | | |
| IMS | 177.800000 | -- | 177.800000 x | | * | |

331

*SURFACE NOTES
    2    JML 67891 PCV SF10
    4    JML 70552 DCX BK7
    8    Edm Sci 53115 DCV 75mm dia, -100 mm fl, Th 5mm?
   10   Edm Sci 53114 DCV 75mm dia, -75mm FL, Th 3 mm
   12   JML 64015 Neg Merriscus LLF1

*ASPHERIC SURFACE DATA
    7    ASP ASR    10 - SYMMETRIC GENERAL ASPHERE
          AS0    --    AS1    -0.005597 AS2    4.4030e-08 AS3    --
          AS4    --    AS5    --

332

*SURFACE TAG DATA
   14   ASI   1
         DRW ON

*REFRACTIVE INDICES

| SFR | GLASS | RN1 | RN2 | RN3 | VNBR | TCE |
|---|---|---|---|---|---|---|
| 0 | AIR | 1.000000 | 1.000000 | 1.000000 | -- | -- |
| 1 | AIR | 1.000000 | 1.000000 | 1.000000 | -- | 236.000000 |
| 2 | SF10 | 1.728250 | 1.746482 | 1.720848 | 28.409716 | 75.000000 |
| 3 | AIR | 1.000000 | 1.000000 | 1.000000 | -- | 236.000000 |
| 4 | BK7 | 1.516800 | 1.522376 | 1.514322 | 64.166410 | 71.000000 |
| 5 | AIR | 1.000000 | 1.000000 | 1.000000 | -- | 236.000000 |
| 6 | CARBO | 1.585469 | 1.599220 | 1.579900 | 30.303790 | -- |
| 7 | AIR | 1.000000 | 1.000000 | 1.000000 | -- | 236.000000 |
| 8 | BK7 | 1.516800 | 1.522376 | 1.514322 | 64.166410 | 71.000000 |
| 9 | AIR | 1.000000 | 1.000000 | 1.000000 | -- | 236.000000 |
| 10 | BK7 | 1.516800 | 1.522376 | 1.514322 | 64.166410 | 71.000000 |
| 11 | AIR | 1.000000 | 1.000000 | 1.000000 | -- | 236.000000 |
| 12 | LLF1 | 1.548140 | 1.556547 | 1.544566 | 45.749335 | 81.000000 |
| 13 | AIR | 1.000000 | 1.000000 | 1.000000 | -- | 236.000000 |
| 14 | IMAGE SURFACE | | | | | |

*APERTURES

| SRF | TYPE | APERTURE RADIUS |
|---|---|---|
| 0 | SPC | 292.000000 |
| 1 | SPC | 10.000000 |
| 2 | SPC | 22.000000 |
| 3 | PKP | 22.000000 |
| 4 | SPC | 23.240000 |
| 5 | PKP | 23.240000 |
| 6 | SPC | 30.000000 |
| 7 | SPC | 30.000000 |
| 8 | SPC | 37.500000 |
| 9 | SPC | 33.300000 |
| 10 | SPC | 37.500000 |
| 11 | SPC | 32.800000 |
| 12 | SPC | 32.800000 |
| 13 | SPC | 52.500000 |
| 14 | SPC | 177.800000 |

Special Aperture Group 0:
A    ATP    Ellipse    AAC    Pass Thru    AAN    --
     AX1   -70.000000  AX2    70.000000    AY1   -70.000000   AY2   70.000000

*WAVELENGTHS

| CURRENT | wv1/ww1 | wv2/ww2 | wv3/ww3 |
|---|---|---|---|
| 1 | 0.587560 | 0.486130 | 0.656270 |
|   | 1.000000 | 1.000000 | 1.000000 |

*PARAXIAL SETUP OF LENS
APERTURE
   Entrance beam radius:    0.724036     Image axial ray slope:    0.010000
   Object num. Aperture:    0.000453     F-number:                -37.131424
   Image num. Aperture:  *  0.010000     Working F-number:         50.000000
FIELD
   Field angle:            10.342657     Object height:      *    292.000000
   Gaussian image height: -13.213647     Chief ray ims height:     19.605736
CONJUGATES
   Object distance:       -1.6000e+03    Srf 1 to prin. pt. 1:    358.025381
   Gaussian image dist.:  -55.481113     Srf 13 to prin. pt. 2:     0.720991
   Overall lens length:   225.842060     Total track length:      -1.4062e+03
   Paraxial magnification: -0.045252     Srf 13 to image srf:     -32.000000
OTHER DATA
   Entrace pupil radius:    0.724036     Srf 1 to entrace pup.:    --
   Exit pupil radius:       0.094539     Srf 13 to exit pupil:    -46.027214
   Lagrange invariant:     -0.132136     Petzval radius:           54.277855
   Effective focal length: -53.768941
SPOT DIAGRAMS
   Aperture divisions:     17.030000     Gaussian apod. spec.:    Off
   X 1/e^2 entr. irrad.:    1.000000     Y 1/e^2 entr. irrad.:     1.000000
Note: This optical system contains special surface data.
    Calculations based on a paraxial raytrace may be invalid.

FIG. 3C continued

*LENS DATA
18in sphere

| SRF | CURVATURE | THICKNESS | APERTURE RADIUS | GLASS | SPE | NOTE |
|---|---|---|---|---|---|---|
| OBJ | -- | 24.700000 | 9.000000 | AIR | * | |
| 1 | 0.032916 V | 2.000000 | 14.000000 | SF1 C | | |
| 2 | 0.037270 V | 6.999999 V | 14.000000 | SK11 C | | |
| 3 | -0.017675 V | 0.500000 | 14.000000 | AIR | | |
| 4 | 0.054772 V | 1.600000 | 11.000000 | LAFN7 C | | |
| 5 | 0.096657 V | 8.762197 V | 10.000000 | KF3 C | | |
| 6 | 0.007371 V | 0.500000 | 10.000000 | AIR | | |
| 7 | 0.042506 V | 2.000000 | 8.000000 | SF11 C | | |
| 8 | 0.098204 V | 12.000000 | 8.000000 | KF3 C | | |
| 9 | 0.010972 V | 1.400000 | 8.000000 | AIR | | |
| AST | -- | 13.800000 | 2.875605 AS | AIR | | |
| 11 | 0.005249 V | 12.600000 | 14.000000 | SF10 C | | |
| 12 | -0.058288 V | 7.000000 | 14.000000 | SK16 C | | |
| 13 | 0.006234 V | 15.00000 | 16.000000 | AIR | | |
| 14 | -0.058480 | 3.000000 | 16.300000 | BK7 C | | |
| 15 | -0.008000 | 21.800000 | 25.000000 | AIR | | |
| 16 | -0.031725 | 3.800000 | 30.000000 | BK7 C | | |
| 17 | -0.013089 | 28.000000 | 45.000000 | AIR | | |
| 18 | -0.019048 | 7.000000 | 51.000000 | BK7 C | | |
| 19 | -0.006970 | -60.000000 | 95.000000 | AIR | | |
| IMS | 0.004374 | -- | 230.000000 X | | * | |

*REFRACTIVE INDICES

| SFR | GLASS | RN1 | RN2 | RN3 | VNBR | TCE |
|---|---|---|---|---|---|---|
| 0 | AIR | 1.000000 | 1.000000 | 1.000000 | -- | -- |
| 1 | SF1 | 1.717360 | 1.734621 | 1.710313 | 29.511275 | 81.000000 |
| 2 | SK11 | 1.563840 | 1.570284 | 1.561010 | 60.795650 | 65.000000 |
| 3 | AIR | 1.000000 | 1.000000 | 1.000000 | -- | 236.000000 |
| 4 | LAFN7 | 1.749502 | 1.764639 | 1.743193 | 34.948736 | 53.000000 |
| 5 | KF3 | 1.514540 | 1.521099 | 1.511692 | 54.699656 | 81.000000 |
| 6 | AIR | 1.000000 | 1.000000 | 1.000000 | -- | 236.000000 |
| 7 | SF11 | 1.784720 | 1.806455 | 1.775987 | 25.755289 | 61.000000 |
| 8 | KF3 | 1.514540 | 1.521099 | 1.511692 | 54.699656 | 81.000000 |
| 9 | AIR | 1.000000 | 1.000000 | 1.000000 | -- | 236.000000 |
| 10 | AIR | 1.000000 | 1.000000 | 1.000000 | -- | 236.000000 |
| 11 | SF10 | 1.728250 | 1.746482 | 1.720847 | 28.408719 | 75.000000 |
| 12 | SK16 | 1.620410 | 1.627557 | 1.617271 | 60.320455 | 63.000000 |
| 13 | AIR | 1.000000 | 1.000000 | 1.000000 | -- | 236.000000 |
| 14 | BK7 | 1.516800 | 1.522376 | 1.514322 | 64.163927 | 71.000000 |
| 15 | AIR | 1.000000 | 1.000000 | 1.000000 | -- | 236.000000 |
| 16 | BK7 | 1.516800 | 1.522376 | 1.514322 | 64.163927 | 71.000000 |
| 17 | AIR | 1.000000 | 1.000000 | 1.000000 | -- | 236.000000 |
| 18 | BK7 | 1.516800 | 1.522376 | 1.514322 | 64.163927 | 71.000000 |
| 19 | AIR | 1.000000 | 1.000000 | 1.000000 | -- | 236.000000 |
| 20 | IMAGE SURFACE | | | | | |

FIG. 9B

*APERTURES

| SRF | TYPE | APERTURE RADIUS |
|---|---|---|
| 0 | SPC | 9.000000 |
| 1 | SPC | 14.000000 |
| 2 | SPC | 14.000000 |
| 3 | SPC | 14.000000 |
| 4 | SPC | 11.000000 |
| 5 | SPC | 10.000000 |
| 6 | SPC | 10.000000 |
| 7 | SPC | 8.000000 |
| 8 | SPC | 8.000000 |
| 9 | SPC | 8.000000 |
| 10 | CMP | 2.875605 |
| 11 | SPC | 14.000000 |
| 12 | SPC | 14.000000 |
| 13 | SPC | 16.000000 |
| 14 | SPC | 16.300000 |
| 15 | SPC | 25.000000 |
| 16 | SPC | 30.000000 |
| 17 | SPC | 45.000000 |
| 18 | SPC | 51.000000 |
| 19 | SPC | 95.000000 |
| 20 | SPC | 230.000000 |

Special Aperture Group 0:
  A   ATP      Ellipse   AAC   Pass Thru   AAN      --
      AX1  -105.000000   AX2   105.000000   AY1  -105.000000   AY2   105.000000

*WAVELENGTHS

| CURRENT | wv1/ww1 | wv2/ww2 | wv3/ww3 |
|---|---|---|---|
| 1 | 0.587560 | 0.486130 | 0.656280 |
|   | 1.000000 | 1.000000 | 1.000000 |

*PARAXIAL SETUP OF LENS
APERTURE
   Entrance beam radius:  *          3.000000    Image axial ray slope:      -0.001528
   Object num. aperture:              0.120571    F-number:                  2.4346e-19
   Image num. aperture:               0.001517    Working F-number:          329.596329
FIELD
   Field angle:                     5.1566e-18    Object height:    *        -9.000000
   Gaussian image height:           715.318127    Chief ray ims height:      -13.092823
CONJUGATES
   Object distance:                  24.700000    Srf 1 to prin. pt. 1:      -18.711634
   Gaussian image dist.:            418.643524    Srf 19 to prin. pt. 2:     -57.310580
   Overall lens length:             148.262197    Total track length:        112.962197
   Paraxial magnification:          -79.479792    Srf 19 to image srf:       -60.000000
OTHER DATA
   Entrance pupil radius:           1.2146e+19    Srf 1 to entrance pup.:    1.0000e+20
   Exit pupil radius:                 0.718294    Srf 19 to exit pupil:      -51.396622
   Lagrange invariant:               -1.093117    Petzval radius:            -100.672057
   Effective focal length:            5.913958
SPOT DIAGRAMS
   Aperture divisions:               32.000000    Gaussian apod. spec.:      Off
   X 1/e^2 entr. irrad.:              1.000000    Y 1/e^2 entr. irrad.:      1.000000
Note: This optical system contains special surface data.
    Calculations based on a paraxial raytrace may be invalid.

FIG. 9B continued

DISPLAY SYSTEM HAVING A THREE-DIMENSIONAL CONVEX DISPLAY SURFACE

CROSS-REFERENCE TO RELATED APPLICATION

This application claims priority under 35 U.S.C. § 119(e) to U.S. Provisional Patent Application Ser. No. 60/435,973, "Display System Having a Three-dimensional Convex Display Surface," by Steven W. Utt et al., filed Dec. 20, 2002, the subject matter of which is incorporated herein by reference in its entirety.

BACKGROUND OF THE INVENTION

1. Field of the Invention

This invention relates generally to projection display systems and, more specifically, to projection display systems capable of projecting images onto a three-dimensional convex display surface that is greater than a hemisphere.

2. Description of the Related Art

In many fields of endeavor, it has been a long sought after goal to provide a display system that can generate an image that covers an entire sphere or, more generally, that covers the entire surface of some convex shape. Such a display system would have many different uses. For example, in the planetary sciences, the display system could be used to display information such as planetary weather and temperature. Pharmaceutical applications include visualizing molecules. Architectural applications include visualizing buildings. Other applications will be apparent.

Others have attempted to build such a display system and their efforts can be divided into several different categories. In one category, the display system includes multiple elements that individually conduct and emit light, for example as shown in U.S. Pat. No. 5,030,100, "Environmental Display System." However, these systems typically are expensive and difficult to manufacture. They often require thousands of minute elements, typically LEDs or fiber optic conductors, and the display end of the elements typically must be very accurately placed in order to achieve a quality display. In the case of fiber optic conductors, both ends of the conductor typically must be accurately placed. As an example, a typical resolution for modem computer display systems is 1024 by 768 pixels. Over 750,000 elements would be required to implement a display system with similar resolution. Moreover, if the display is to be viewed from its exterior, the non-display portions of the elements (e.g., the wiring for LEDs or the lengths of fibers) typically are routed through the interior of the display. With so many elements routed through the interior of the display, the display typically must be constructed of multiple pieces that are subsequently attached together. However, this results in seams that often can be easily detected by the viewer.

In another class of approaches, the display system is constructed from a number of ,individual displays that are patched together to form a segmented display. Examples of this approach include U.S. Pat. No. 5,023,725, "Method and Apparatus for Dodecahedral Imaging System" and U.S. Pat. No. 5,703,604, "Immersive Dodecaherdal Video Viewing System." However, this approach requires multiple image sources (one for each display), each of which is projected onto a portion of the overall display. The systems attempt to correct for any seams, overlaps or registration errors in the resulting composite image. They can be substantially more expensive to manufacture, assemble, and align than a system that uses only a single projector. In addition, these systems are most often used in situations where the viewer is located in the interior of the display surface, such as domes for planetary displays or in flight simulators. This is because the multiple image sources and projection optics can then be located exterior to the display surface, where there is more space. This class of display systems is not well suited for transmissive displays (i.e., displays viewed from the exterior) or to display surfaces of smaller size, for example under a few feet in diameter, due to the size and complexity of arranging the image sources and projection optics.

Convex reflectors form the basis of another category, as exemplified in U.S. Pat. No. 6,327,020, "Full-Surround Spherical Screen Projection System And Recording Apparatus Therefor." However, these systems also suffer from a number of limitations. One significant drawback is that these systems typically have dead zones where no light is visible. For example, in one common design, a projector protrudes into the interior of the display surface. The image is projected from the projector to a convex mirror to a reflecting mirror to the display surface. The convex mirror is located deep in the interior of the display surface. In this geometry, dead zones may occur at the location of the projector, in front of or behind the convex mirror, behind the reflecting mirror, and/or behind the supports for the mirrors. In many situations these dead zones will be noticeable, for example in externally-viewed displays where the viewer can approach the display and view it from all different angles, or in internally-viewed displays where the viewer has the freedom and desire to look in any direction such as in a planetarium where the viewer is surrounded by the universe. In addition, the convex mirror is substantially larger than the projector, resulting in a much larger dead zone than that generated by the projector alone.

Volumetric displays are another class of approaches, for example as shown in U.S. Pat. No. 6,183,088, "Three-dimensional Display System." In this approach, some sort of complex mechanism is used to generate a display that can be described as a collection of voxels (as opposed to a projection of pixels onto a non-flat surface). However, these displays are typically limited to external viewing. Furthermore, they are generally expensive because they require a substantial amount of custom electronics and complex mechanical mechanisms. These can also lead to reliability issues. This general class is also not very mature as a technology or an industry. Thus, they typically have low resolution and a limited range of colors.

Thus, there is a need for a display system that can generate images on a three-dimensional (i.e., non-planar) display surface and which overcomes some or all of the drawbacks discussed above.

SUMMARY OF THE INVENTION

The present invention overcomes the limitations of the prior art by providing a display system with a display surface having a three-dimensional convex shape. A projection system projects an object field onto a continuous image field that has the same shape as the display surface. The ratio of the longest image distance to the shortest image distance is at least 1.75. Additionally, the image field can subtend an angle of at least 240 degrees to provide greater than hemispherical coverage, or at least 300 degrees to provide near completely spherical coverage. In alternate embodiments, the display surface can be different shapes, including for example spherical, spheroid, and approximately a rectangular solid.

In one approach, the projection system includes a projector optically coupled to a lens system. The image field generated by the projector is used as a virtual object field for the lens system, which projects it onto the interior of the display surface. Examples of projectors include digital video projectors, slide projectors, movie projectors and projection television. In some designs, the projection system can accommodate display surfaces of varying size by varying a focus of the projector. In a different approach, the projection system includes an integral projection lens system.

In some applications, the display surface is viewed from its exterior. In these cases, the display surface preferably is translucent or otherwise transmissive. In other applications, the display surface is viewed from its interior, in which case the display surface preferably is reflective.

In one design, the display surface includes an aperture and the image field covers substantially the entire interior of the display surface exclusive of the aperture. For example, a physical support for the display surface can be used to hide the aperture from view, giving the illusion that the image is projected onto the entire display surface.

Other aspects of the invention include lens designs suitable for use in these projection systems, applications for the projection systems and corresponding methods.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 3C is a table of lens data for the lens system shown in FIGS. 3A-3B.

FIGS. 9A-9C are diagrams illustrating another embodiment of a projection system.

DETAILED DESCRIPTION OF THE PREFERRED EMBODIMENTS

Figure 1:
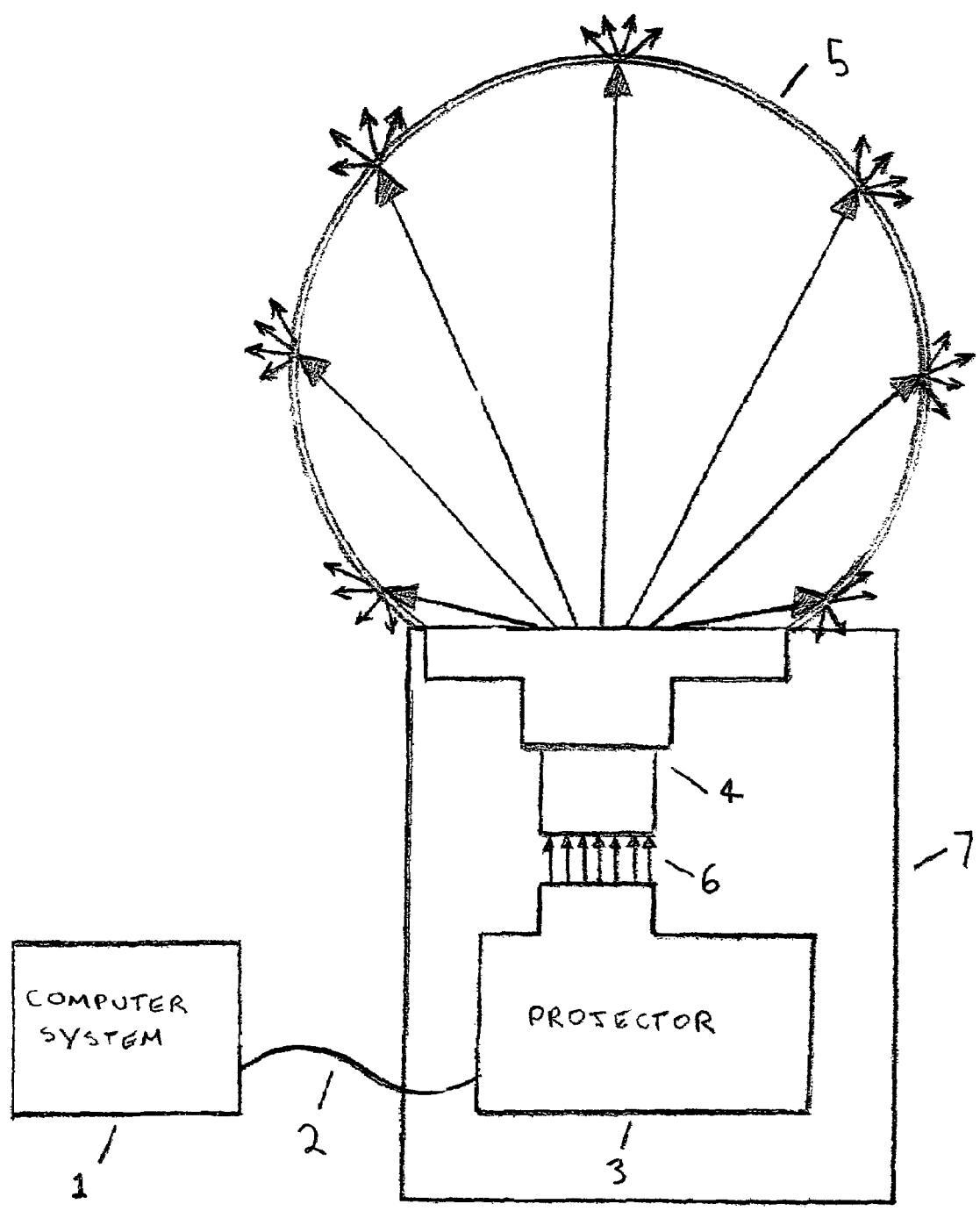
FIG. 1 is a cross sectional view of an example display system according to the invention.

FIG. 1 is a cross sectional view of an example display system according to the invention. It includes a display surface 5 that has a three-dimensional convex shape, and a projection system 7. The projection system projects an object field onto a continuous image field that has the same shape as the display surface 5, thus forming a displayed image.

The example of FIG. 1 also includes a computer system 1 that is connected to the projection system 7 by a computer video cable 2. The projection system 7 includes a projector 3 (in this case, a digital video projector) and a lens system 4. A video output port of the computer system 1 is connected by cable 2 to the digital video projector 3. The digital video projector 3 takes as input a video signal from the computer system 1 and displays the video signal onto an electronically controlled display, for example a liquid crystal display. In the absence of the rest of the system, the optics in the projector 3 would project the flat object (i.e., the electronically controlled display) onto a flat image field, for example a screen. The projector 3 typically has a focus adjustment that allows the distance to the screen to be varied.

However, in projection system 7, the projector 3 is optically coupled 6 to the lens system 4. Therefore, the flat image field from the projector 3 is not the final image field for the overall projection system 7. Instead, it serves as the object field for the lens system 4. Because of the location of lens system 4, this intermediate object field is a virtual one. The lens system 4 projects the intermediate object field onto the interior of the spherical display surface 5. In other words, the image field for the lens system 4 (and for the overall projection system 7) has a convex shape that is designed to match the convex shape of the display surface 5. In this example, the display surface 5 is translucent. When viewed from the exterior of the display surface 5, the projected image appears to continuously cover a substantial portion of the entire display surface 5, as depicted in FIG. 2B. If the projector 3 image is changed in real time, then the image displayed on the display surface 5 can be dynamic.

While this specific example utilizes a digital video projector 3, other embodiments can use other projectors, including for example slide projectors, movie projectors, and projection television, in order to suit various applications. Further, while this embodiment utilizes a display surface 5 that is spherical, other embodiments can use display surfaces of different shapes and sizes, including for example a spheroidal display surface and display surfaces that are shaped to match a physical object.

The display system described can also be designed for use in many different applications. In one application, the display system is designed for the field of planetary sciences and the goal is to display images of a planet such as the earth. The images can illustrate a number of items, for example geography, topography, biosphere, plate tectonics, and weather. In this application, the display surface 5 typically is spherical in shape, in order to provide the impression to a viewer that it is a scale model of the planet. The display surface 5 can be different sizes, for example smaller if it is to be placed on a tabletop or in a classroom or lab, larger if it is to be placed in a corporate lobby, or even very large if it is to be used in a museum display.

The resolution of the images and the source of the images can also vary, depending on the application. For example, if the display system is intended to display high-resolution satellite images of the earth, the projection system 7 can be a slide or movie projection system capable of displaying very high-resolution images. If the intent is to display lower resolution animations of the earth's (or some other planet's) weather, for example, the projection system 7 can be a lower resolution digital video projector 3. The projection system 7 can project a small amount of light for use in a classroom that has its lights turned off, or a large amount of light for use in a planetarium.

In another class of applications, the display system is designed so that the display surface is shaped to match a physical object. For example, it can be approximately cockpit-shaped for aeronautical applications, approximately rectangular (i.e., building-shaped) for architectural applications, or approximately shaped as the body of a car for automotive applications. The display surface need not match the shape of the physical object exactly. Moreover, the display surface can be different sizes, ranging from smaller in order to be representational to life size or larger in order to be more realistic or show more detail.

In virtual reality applications, the display system can be designed so that the viewer views the display surface from its interior rather than from its exterior. The structure of the display surface may vary depending on the location of the viewer. For example, a translucent display surface is preferred for viewing from the exterior and a reflective one for viewing from the interior. In addition, different types of diffusers can be used to concentrate (or disperse) the light from the display surface to the location of the viewers. Depending upon where the viewer is located relative to the display surface, the optical axis of the projection system may be above, below, or at an angle to the viewer. For example, in one embodiment, the projection system is located above and behind the viewer's head and, therefore, hidden from view when the viewer s looking straight ahead.

The display system can also be designed for use in the entertainment industry, for example to show special effects. This may require the display surface to be any manner of conceived shape. For example, the display surface can be the shape of an entire head (or almost entire head) in order to display morphing of facial and cranial features.

In the field of life sciences, where it is desirable to have a perceived three-dimensional image displayed, the display system can utilize a stereoscopic projection system. Furthermore, if the display system is designed to implement stereoscopic DNA visualization, it may use a spheroidal display surface rather than a spherical one, because the molecules to be visualized tend to be long and thin.

The display system can also be designed for use in the consumer market. In this situation, production volumes may be high and manufacturing costs may need to be low. As a result, the display system can be designed to use a fewer number of parts and to be manufactured out of plastic, acrylic or other low cost materials.

Figure 2A:
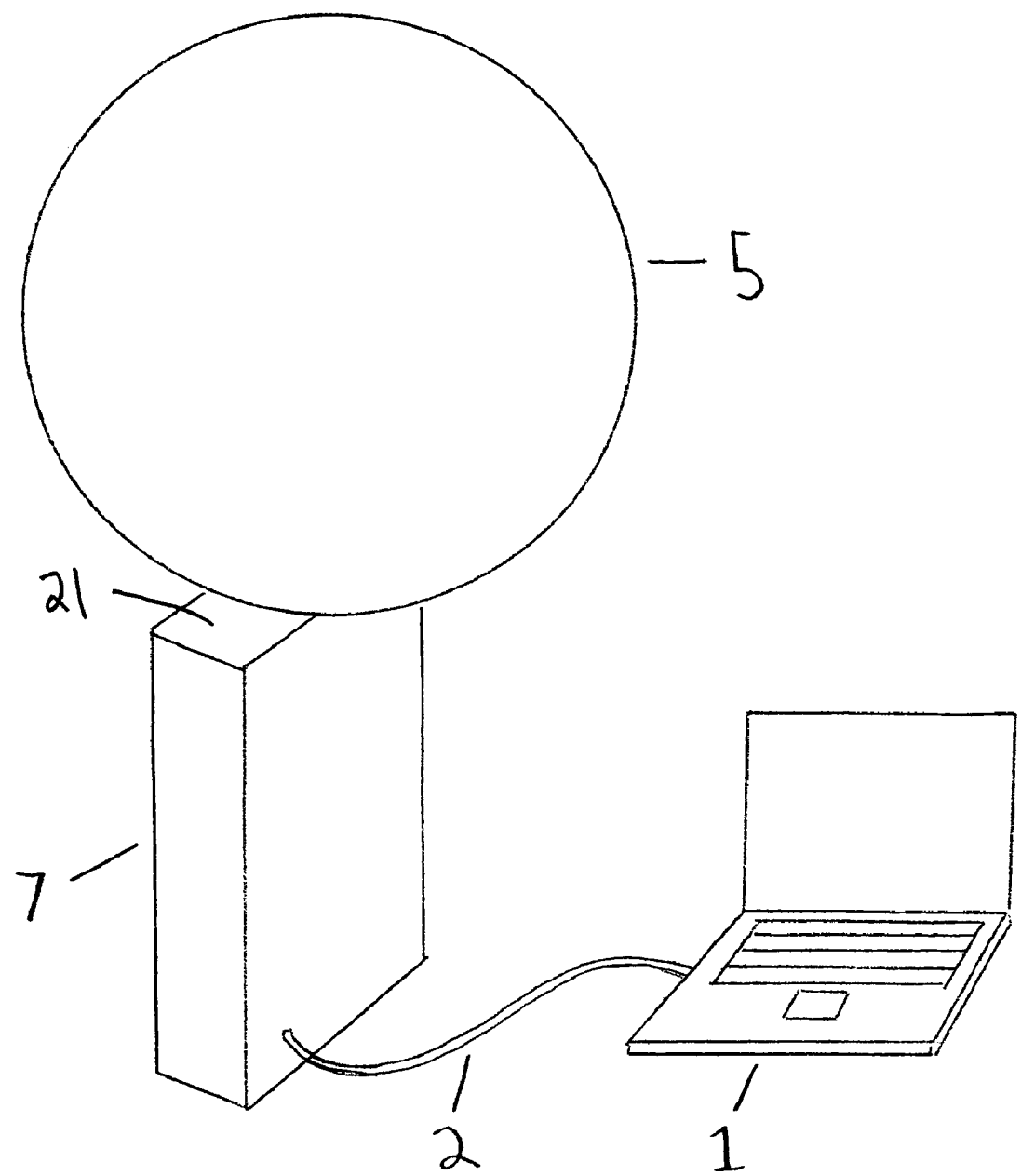
FIGS. 2A-2B are a perspective view and a cut-away view of an example display system.
Figure 2B:
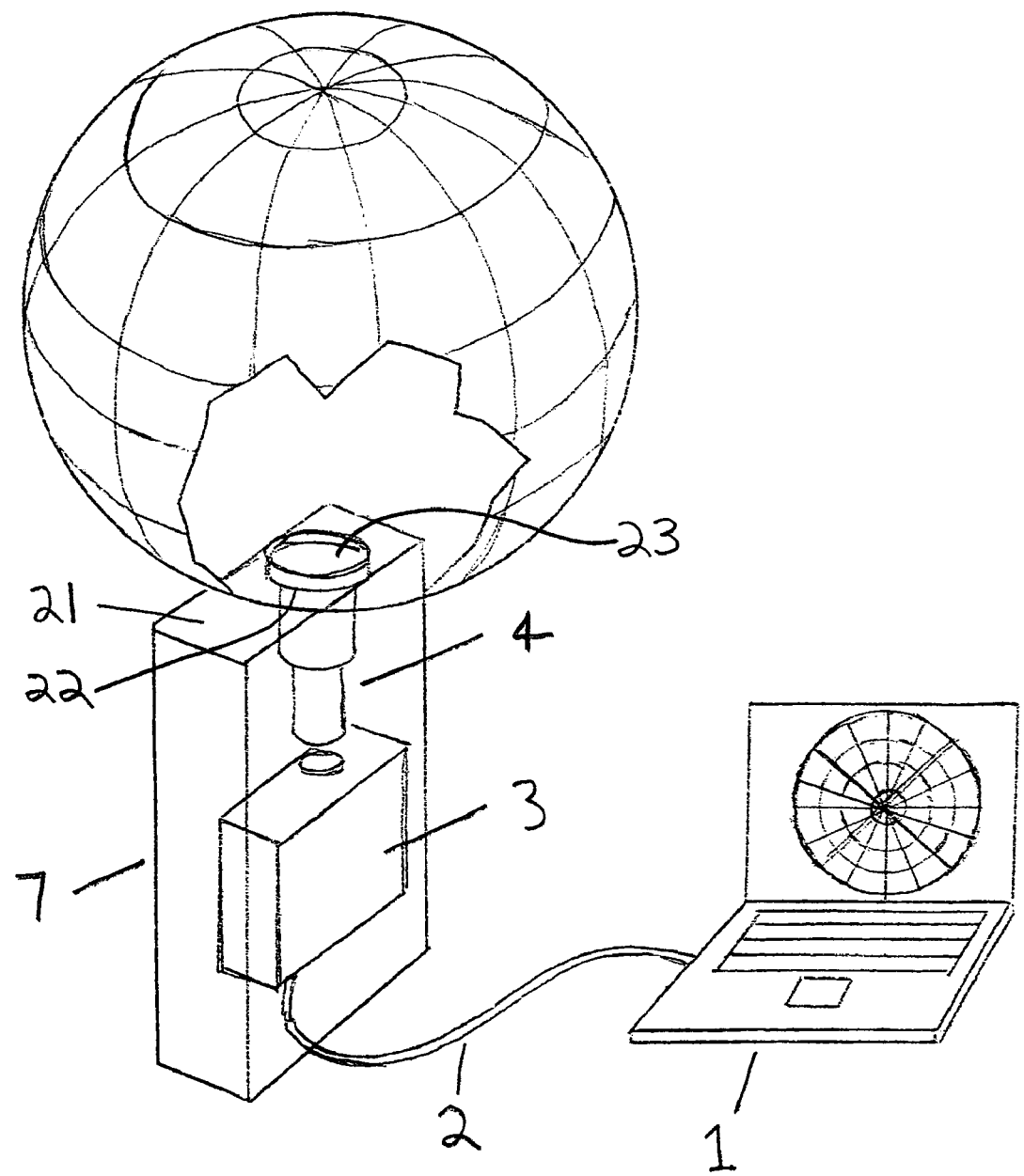

FIGS. 2A-2B are a perspective view and a cut-away view of an example display system. In this example, the projector 3 is mounted within the housing 21. The lens system 4 is mounted directly above the projector 3. In some implementations, it is designed to be mechanically attached to the projector 3. The lens system 4 projects light through a matching hole 22 in the housing. The lens system 4's last optical surface 23 is approximately flush with the top of the housing 21. The display surface 5 is mounted directly on the top of the housing 21. The display surface 5 has an aperture that is matched to the size of the final optical surface 23 of the lens system 4. In alternate embodiments, the display surface 5 is mechanically mounted on the lens system 4.

The projector 3 projects vertically into the lens system 4, which is also vertical. The projector's optical axis is aligned with the optical axis of the lens system 4 which, in turn, is aligned with the axis of the display surface 5. The image generated by the projection system 7 covers substantially the entire display surface 5 exclusive of its aperture. The image field is substantially closed around the last clear surface of the lens system 4. The housing 21 physically supports the display surface 5. It also hides the aperture in the display surface 5 and the lens system 4.

This configuration is also simpler to design and manufacture. To a viewer, it is attractive, because no lens is visible, and only a small portion of the display surface is used for mounting. It leaves the impression with a viewer that the projected image spans an entire 360 degrees of the display surface.

In other embodiments, to suit various applications, the projector can be aligned horizontally or along some other orientation. It may not share the same optical axis as the lens system, requiring additional optics in between. Likewise, the lens system's optical axis need not be vertical. For example, in one variation, the projector 3 is positioned horizontally so that the housing can be flat and wide rather than tall and skinny, making it better suited for tabletop use. Furthermore, the optical axis of the lens system 4 is tilted 23.5 degrees from vertical so that when displaying images of the earth, the earth appears to be at the proper angle relative to the sun. Mirrors or other optics are used to couple light from the horizontal projector 3 to the tilted lens system 4.

Figure 3A:
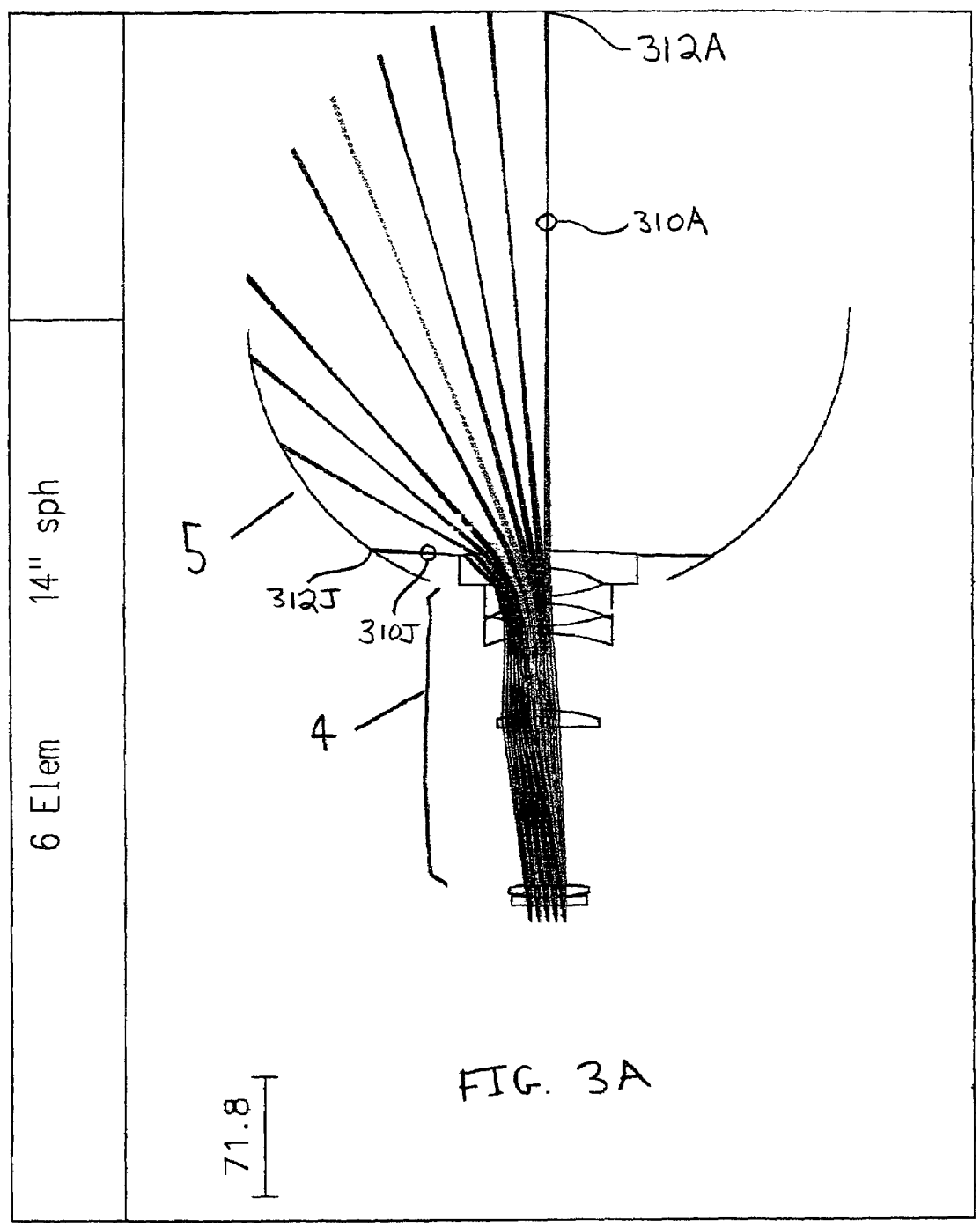
FIGS. 3A-3B are cross sectional views of a lens system suitable for use in the display system of FIGS. 1-2.
Figure 3B:
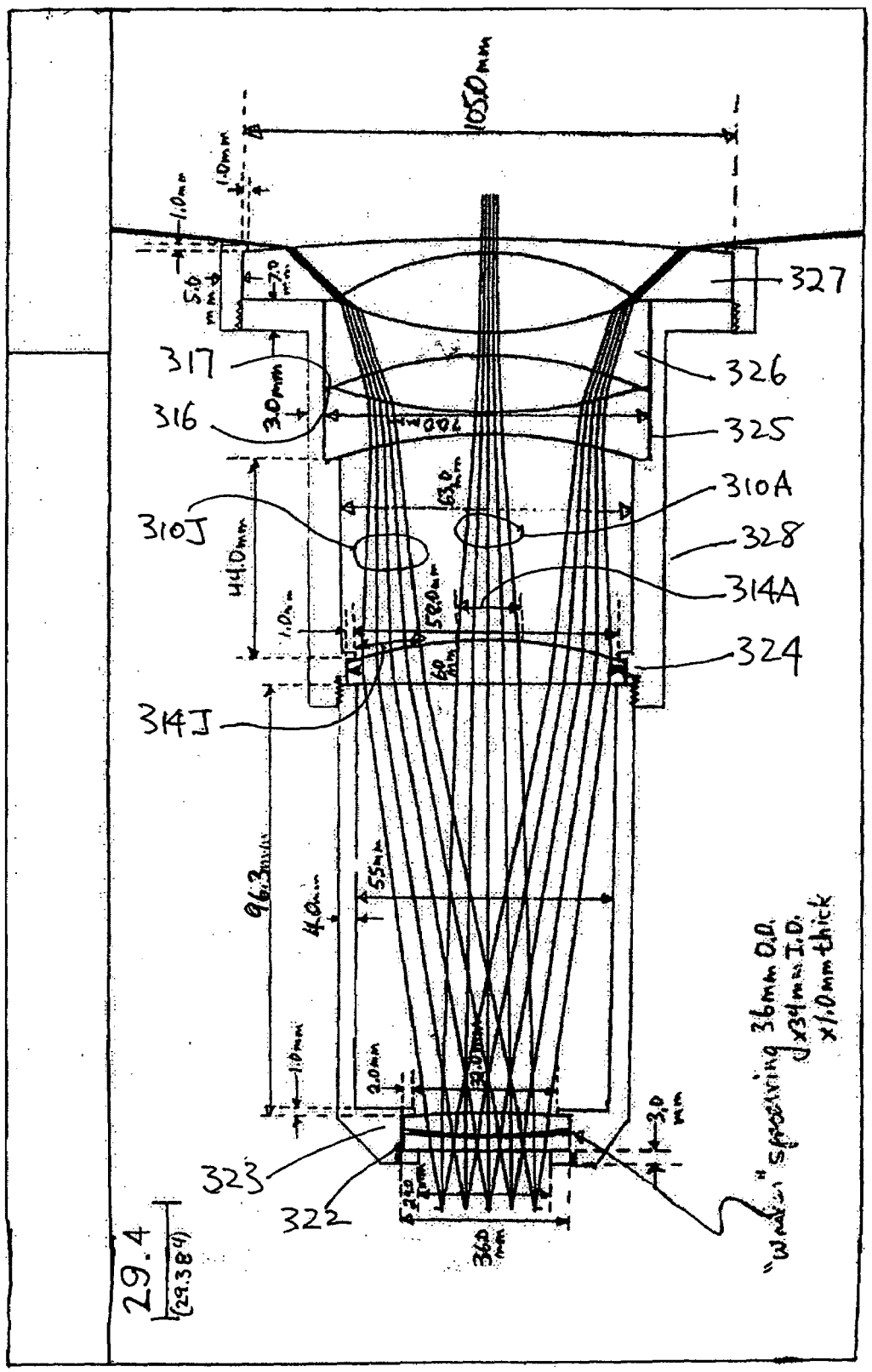

FIGS. 3A-3B are cross sectional views of one lens system 4 suitable for use in the display systems of FIGS. 1-2. FIG. 3C are tables of the design parameter information for the lens system 4. The first table 331, "Lens Data," defines the element curvatures, thickness, air gaps, aperture radii, and glass types. The second table 332, "Aspheric surface data" records the spherical and quadratic coefficients of the aspheric surface. The third table 333, "Refractive Indices" gives the indices of the lens materials. The fifth table 334, "Paraxial Setup of Lens" provides additional relevant data.

FIG. 3A is a cross sectional view showing a ray trace through the lens system 4 onto the display surface 5. Different ray bundles are shown, including the ray bundle 310A destined for the apex image point 312A, and the ray bundle 310J destined for the full field image point. In this example display system, the digital projector 3 located upstream of the lens system 4 is standard. Standard commercial projectors project light to an image plane some number of feet in front of them, where a flat display surface typically is located. As a result, the image from the projector 3 is used as a virtual object for the lens system 4. The lens system 4 projects the virtual flat object field onto a three-dimensional continuous image field to match the shape of the display surface 5.

Referring to FIG. 3B, the lens system 4 operates as follows. The first two lens elements 322 and 323, form an achromatic doublet. This lens group is located close to the aperture of the lens system and serves to provide correction for lateral chromatic aberration.

The third lens element 324 has an aspheric surface and serves two purposes. First, it provides some positive power and serves as a partial field lens between the first lens group 322-323 and the final lens group 325-326-327. Second, the aspheric surface significantly reduces the image distance as the field height increases, so that the image distance at the apex image point is substantially longer than the image distance at the full field image points. This is achieved in part because different ray bundles are physically separated at the aspheric surface. For example, the ray bundle 310A destined for the apex image point has a footprint 314A that is a fraction of the total clear aperture of the aspheric surface. The ray bundle 310J destined for the full field image point also has a small footprint 314J. The two footprints 314A and 314J do not overlap. Therefore, the aspheric surface around footprint 314J can be designed to shorten the image distance for ray bundle 310J without affecting ray bundle 310A.

If the display surface has a different shape, the aspheric surface can be designed to accommodate the specific shape. In some cases, the image distance will increase (instead of decrease) as the field height increases. Generally speaking, the image distance will vary significantly as a function of field height. As a general rule of thumb, the ratio of the longest image distance to the shortest image distance will be at least 1.75.

Another measure of the extent of the display surface is its angular coverage. As a general rule of thumb, the display surface will subtend an angle of at least 240 degrees, where a hemisphere subtends 180 degrees and a complete sphere subtends 360 degrees. Coverage of 300 degrees or more is preferred.

The third lens group includes three spherical elements 325, 326, and 327. It has negative power and serves to increase the exit angle of the ray bundles as the field height increases. For example, ray bundle 310A destined for the apex image point enters the third lens group at an angle of zero degrees relative to the optical axis and leaves the third lens group at the same angle. In contrast, ray bundle 310J destined for the full field image point enters the third lens group at some angle but leaves the third lens group at an exit angle that is substantially perpendicular to the optical axis. In this way, the lens system 4 can produce an image field that covers substantially all of the convex display surface 5. The third lens group achieves this effect in part because the footprints of the different ray bundles are physically separated. Therefore, different optical effects can be applied to ray bundle 310J without affecting ray bundle 310A.

In this implementation, the elements of the third lens group 325, 326, and 327 have flat ground surfaces (for example 316 and 317) around their rims and are stacked directly together. This serves to reduce the cost of the lens barrel 328 in this particular design by eliminating the need for spacers, which would require substantial precision of manufacturing. Cost is also reduced by virtue of the fact that the lens system 4 has no focus mechanism. The projector 3 provides the focus mechanism, including keystone correction. Alternate embodiments may provide a focus mechanism within the lens system 4.

The lens system 4 has a variable image distance to match the distance to the display surface. Traditional fisheye lenses are typically used with cameras, and as such assume an infinite conjugate distance making them unsuitable for use in this application. The lens system 4 provides good homogeneity of spot size as a function of field position, so that at all field heights there is good focus, as shown in FIGS. 4A-4C.

Figure 4A:
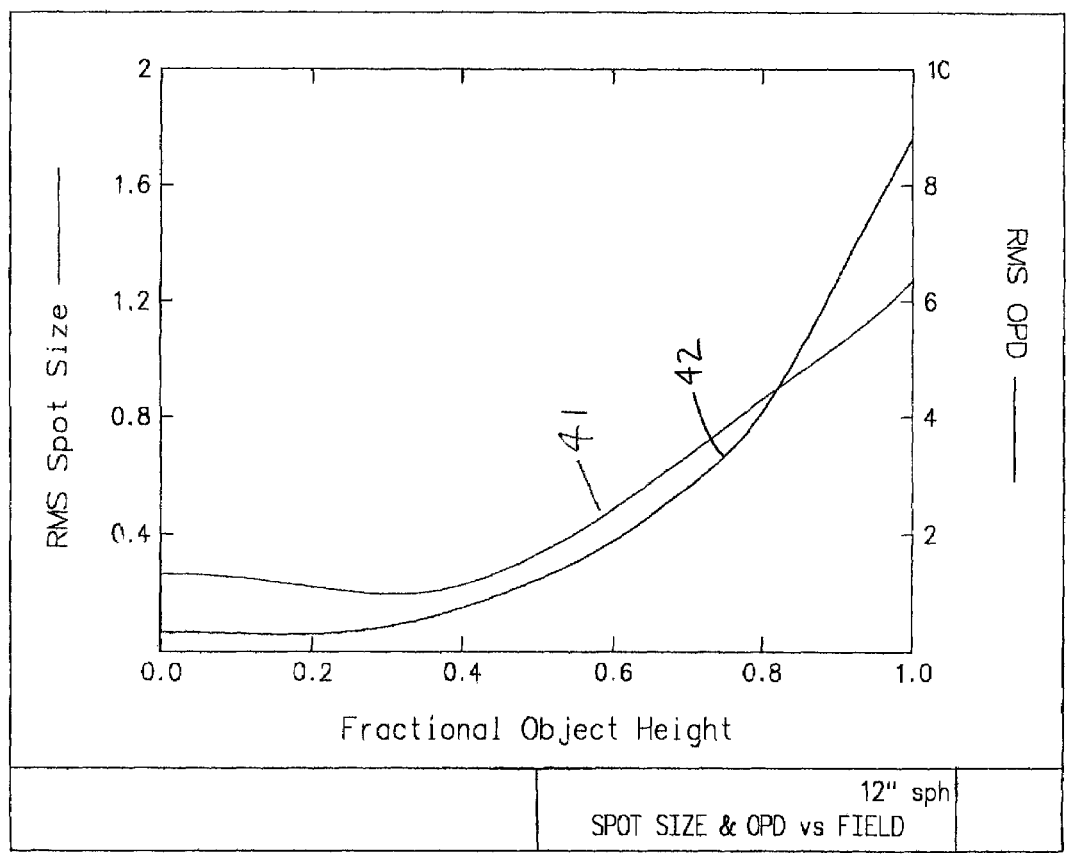
FIGS. 4A-4C are graphs of RMS spot radius as a function of fractional object height for display surfaces of different diameters.
Figure 4B:
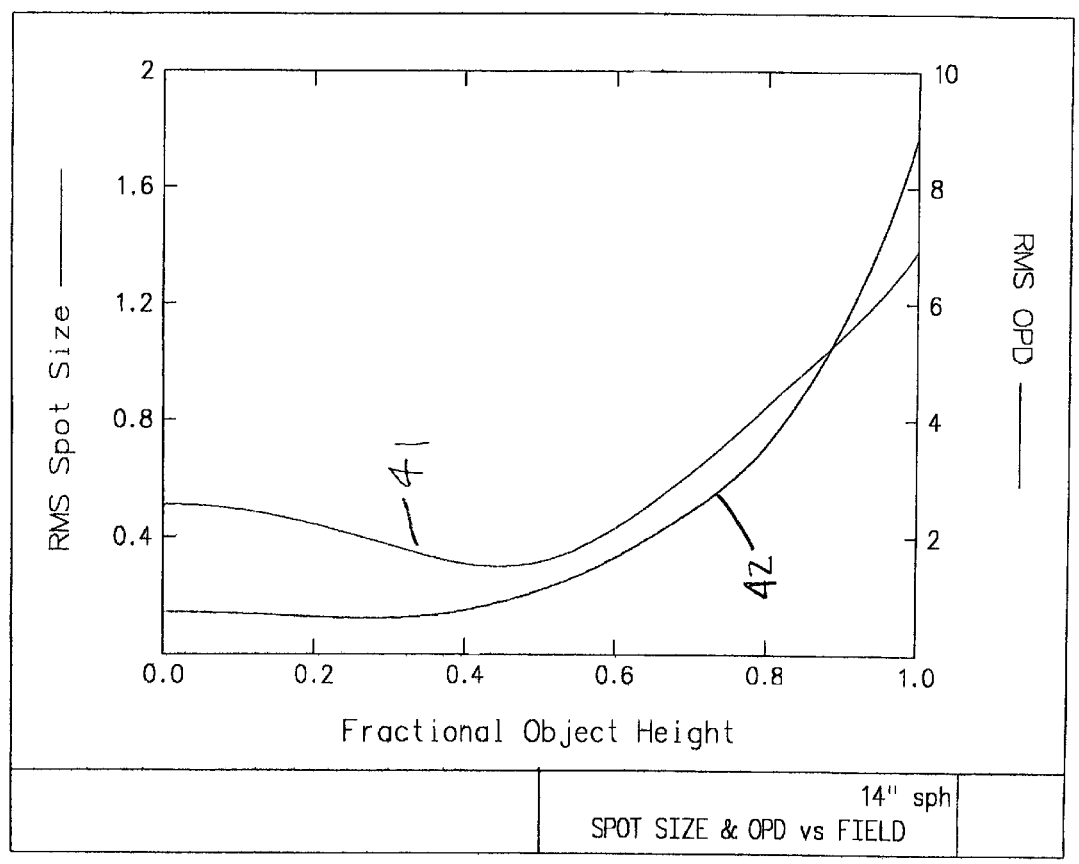
Figure 4C:
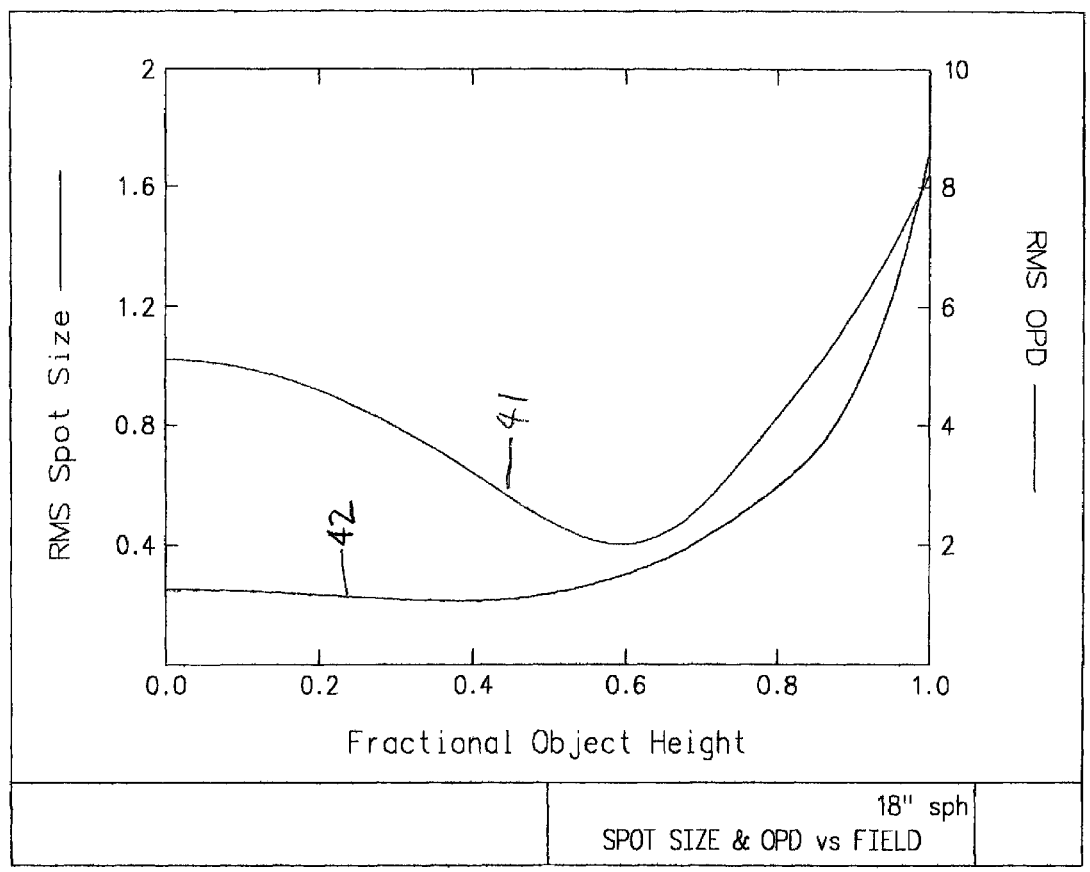

FIGS. 4A-4C are diagrams of RMS spot radius 41 and RMS OPD 42 vs. fractional object height. FIG. 4A is for a 12 inch diameter display surface, FIG. 4B for 14 inch diameter and FIG. 4C for 18 inch diameter. Fractional object height is 0.0 at the image apex, approximately 0.4 at the equator, and 1.0 at approximately 75 degrees south latitude. In this particular example, the image field subtends an angle of approximately 330 degrees. These diagrams illustrate that, with no change in focus of the projector, there is acceptable RMS spot radius 41 at all field heights for display surfaces of different diameters. Changing the focus of the projector and potentially performing keystone correction, to suit a particular display surface diameter, can further improve the RMS spot radius curve.

The example lens system 4 shown in FIGS. 3-4 is designed to work within the range of spherical display surfaces 5 of diameter 12 inches to 22 inches. However, simply by adjusting the focus of the digital projector 3, the lens system 4 has been measured to focus, suitably for various applications, out to a display surface 5 diameter of 20 feet.

In a preferred embodiment, the RMS spot radius 41 has been optimized sufficiently for the display resolution of a digital video projector. The lens design can be further optimized to suit much higher resolution projection systems such as slide projectors. Further, comparable lens performances can be achieved by using lens designs that use a fewer number of lenses which are all aspheric. For example, four (or even fewer) aspheric lenses can achieve similar performance to the six element design shown in FIGS. 3-4.

Figure 5:
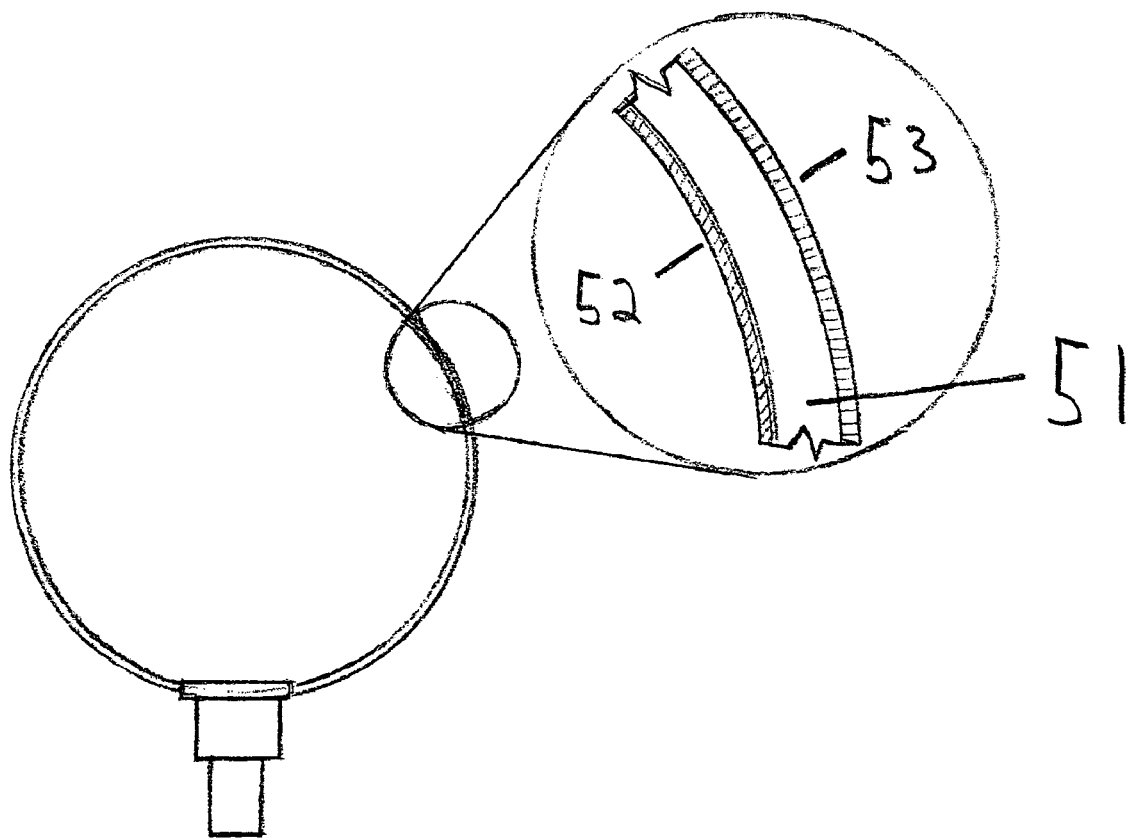
FIG. 5 is a cross-sectional view of a display surface.

FIG. 5 is a cross-sectional view of one display surface 5. In this specific example, the display surface 5 is made of a single piece of transparent acrylic material 51 covered on the inside with multiple layers of a clear acrylic paint 52 that contain a suspension of glass micro-beads so that it is translucent. An antiglare coating 53 is applied to the outside. Other embodiments may use different materials, including glass, polyethylene, rubber or various plastics for the material 51; may or may not use coatings including varnishes and dyes either on one or both of the interior and exterior surface; and various surface treatments.

One advantage of this display surface 5 is that it can be manufactured as a single piece with no seams that must be aligned and attached. For example, it can be blow molded acrylic, or even a balloon. This comparative simplicity of manufacture reduces production cost and improves the quality of the display.

Figure 6A:
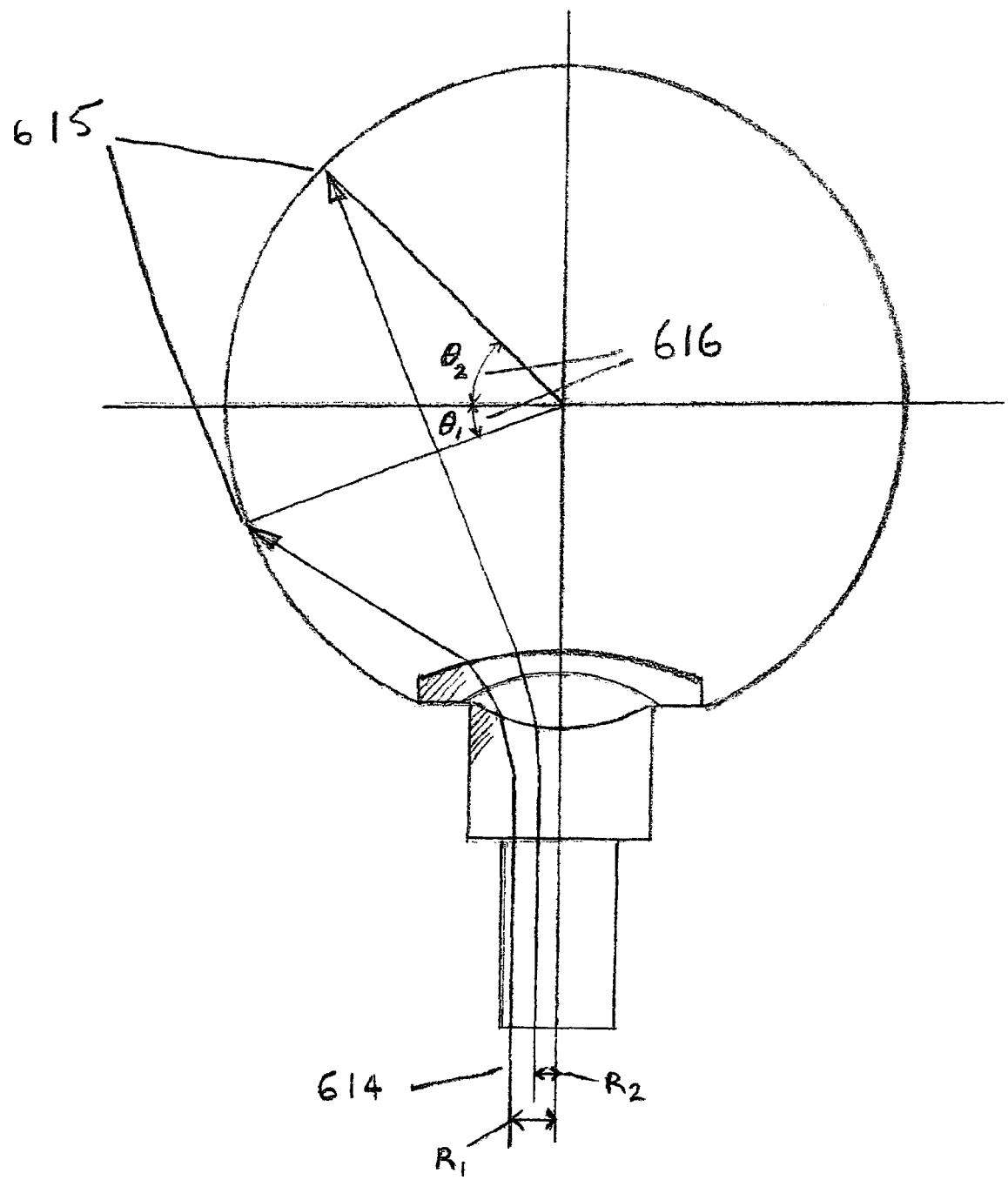
FIGS. 6A-6C illustrate the relationship between the projection system's object field and image field.
Figure 6B:
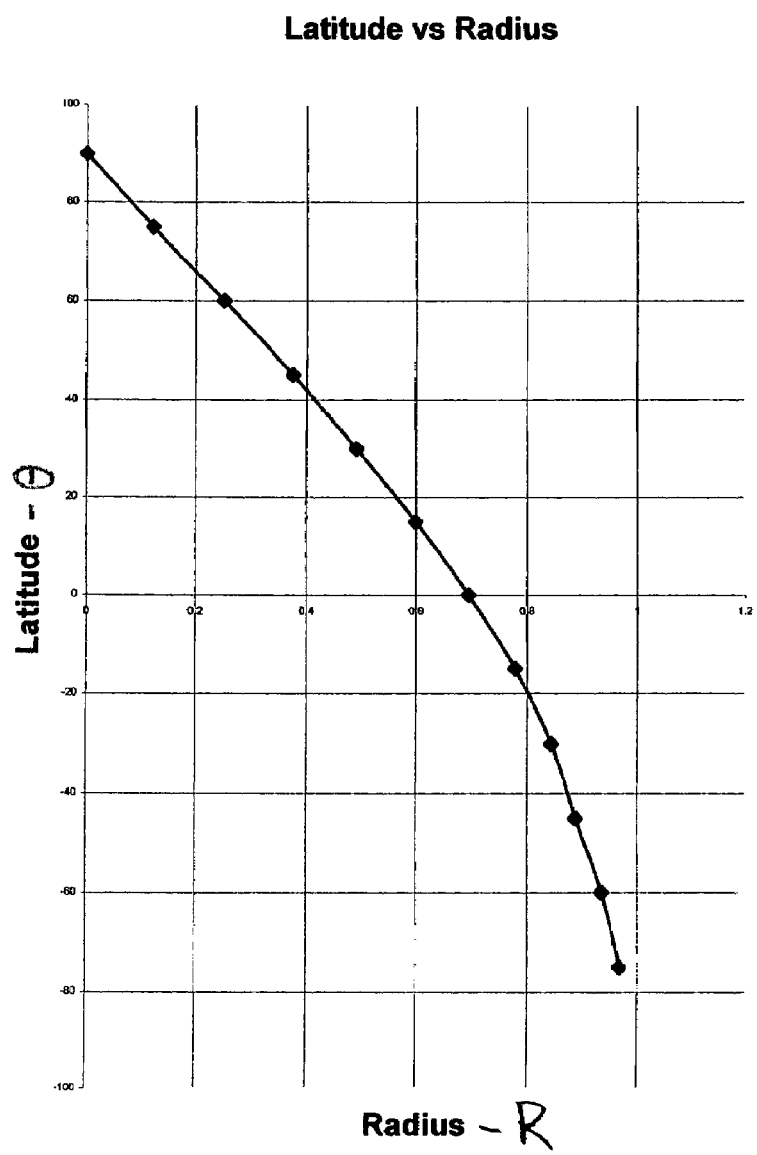
Figure 6C:
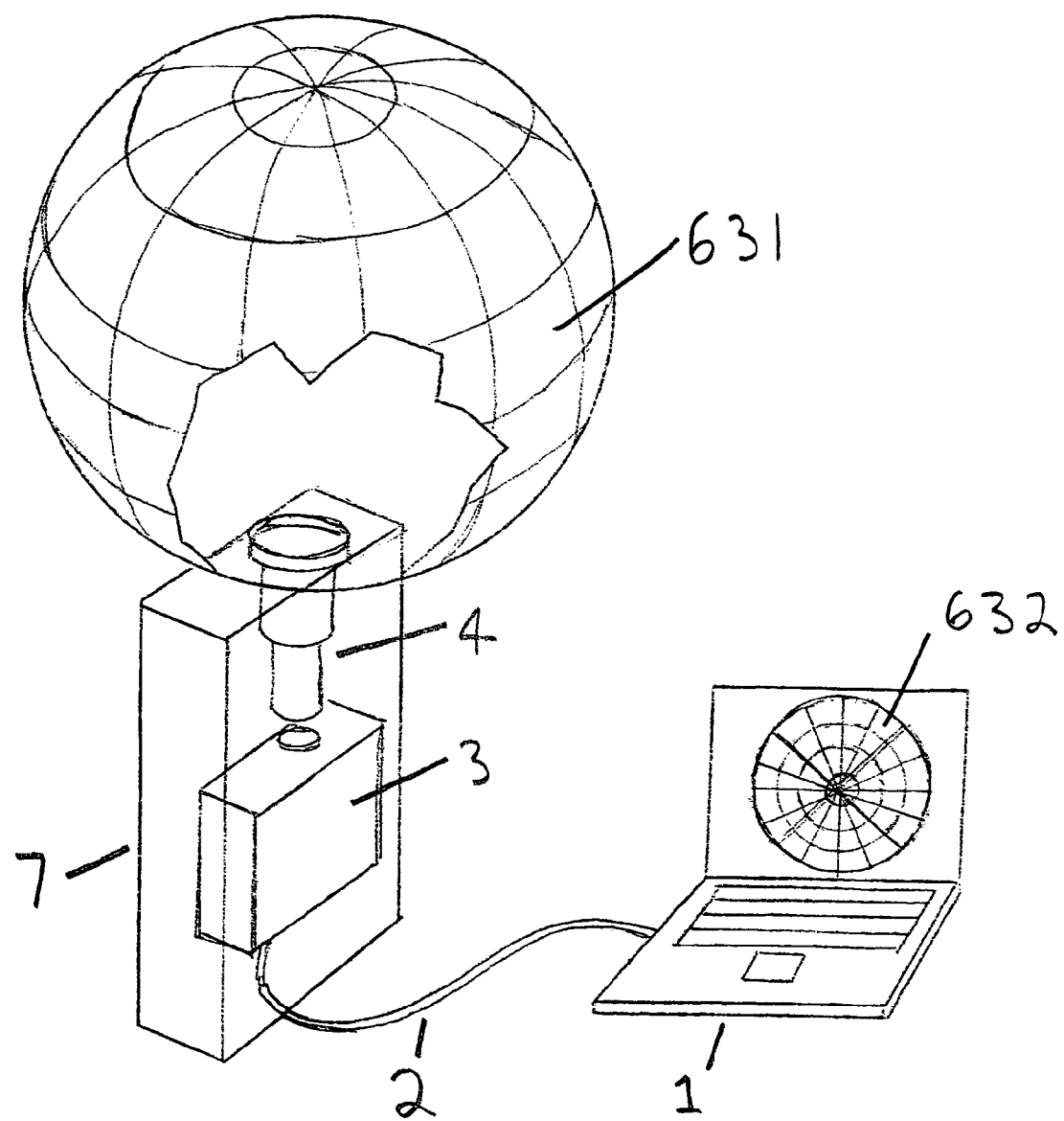

FIGS. 6A-6C illustrate the relationship between the projection system 7's object field and image field in a preferred embodiment. In FIG. 6A, rays 614 which are generated by an object point are projected by the projection system 7 (only lens system 4 is shown in FIG. 6A for simplicity) to their corresponding positions 615 on the display surface 5. The position of the object point can be defined by a radius R and a longitude angle $\lambda$. The corresponding position 615 on the display surface can be defined by a latitude angle $\theta$ 616 and a longitude angle $\lambda$. In a preferred embodiment, the projection system 7 and the display surface 5 are axially symmetric about the optical axis. As a result, all objects points at a given radius R are projected onto the display surface 5 at the same latitude angle $\theta$. The longitude angle $\lambda$ remains the same. There is a continuous function characterizing the projection system that maps between radius R and latitude $\theta$. For example, in FIG. 6A, $R_1$ maps to $\theta_1$ and $R_2$ maps to $\theta_2$. It is a continuous curve in an $(R,\theta)$ coordinate system, as shown in FIG. 6B. The function can be determined by computer simulation (e.g., ray tracing) or by empirical measurement.

In alternate embodiments, the projection system 7 and display surface 5 are not axially symmetric about the optical axis, for example when the display surface is oblong in a direction perpendicular to the optical axis. Therefore, the function that maps object points to image points includes a longitude angle $\lambda$ as well. It is a continuous function that maps between $(R,\lambda_O)$ and $(\theta,\lambda_I)$ where $\lambda_O$ is not necessarily equal to $\lambda_I$.

Turning to FIG. 6C, there is a one-to-one correspondence between the two-dimensional source image 632 input to the projector and the image 631 that appears on the display surface 5. As a result, once the projection system 7 has been characterized by a continuous function as previously described, if it is desired to project a certain image 631 onto the display surface, the corresponding source image 632 can be determined by applying the inverse function to the image 631.

In the axially symmetric example, from the image information in (θ,λ) coordinate space, utilizing the previously described continuous function shown in FIG. 6B, the corresponding image information in the (R,λ) coordinate space of the source image is produced. In FIG. 6C, the image 631 shown is a grid of latitude and longitude lines. The latitude lines become concentric circles in the source image 632, while the longitude lines become radial spokes. The north pole, at the image apex, maps to the center of the source image 632.

Depending upon factors including the format of the images, coordinate system, and resolution of the original image information, as well as the display coordinate system, format and resolution requirements of the source image, operations including image information conversion, image sampling, image interpolation, and texture mapping or other computer graphics operations can be used to create the source image 632 for subsequent display on the projector 3.

Figure 7:
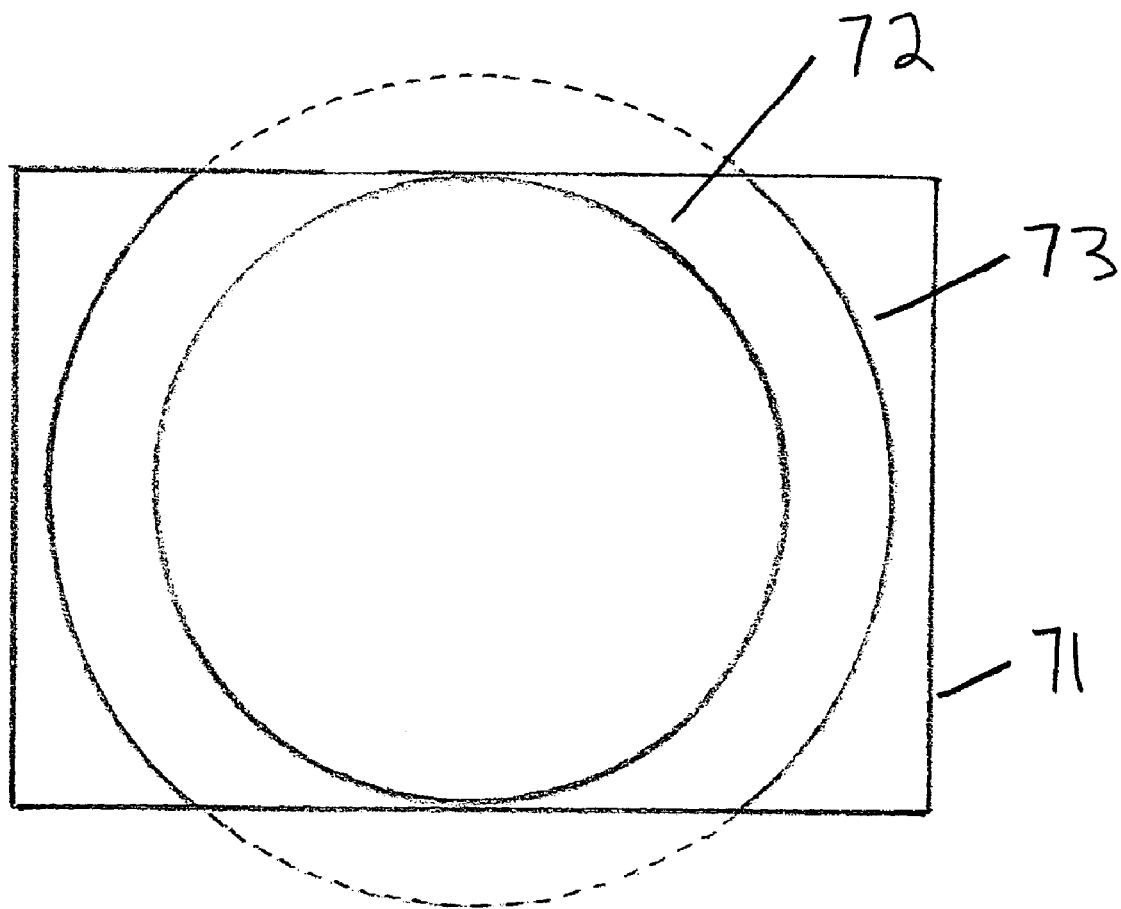
FIG. 7 is a diagram showing the use of pixels on a rectangular display, when the object field is not rectangular.

FIG. 7 shows the use of pixels on a PC projector display 71 when the object field of the projection system is not rectangular. Digital video projectors typically use such a rectangular display, typically with different resolutions horizontally and vertically, such as 1024 by 768 pixels. On the other hand, if the display surface 5 is axially symmetric, the ideal object field is circular, with equal resolutions in the x and y directions. Thus, there is a mismatch between the input display 71 and the ideal object field. In one approach, the system is designed so that the object field 72 is equal to the small dimension of the display 71, although a fair amount of the display 71 remains unused in this approach. Alternately, the object field 73 can be greater than the display size. More of the display 71 is utilized, resulting in greater resolution. However, portions of the object field 73 lie outside the display area 71, and the corresponding portions of the display surface will have no image. This may be advantageous in certain applications. For example, where the underside of the display surface is not visible to the viewer, the visible image will be of greater effective resolution than in the case of an object field 72.

Figure 8:
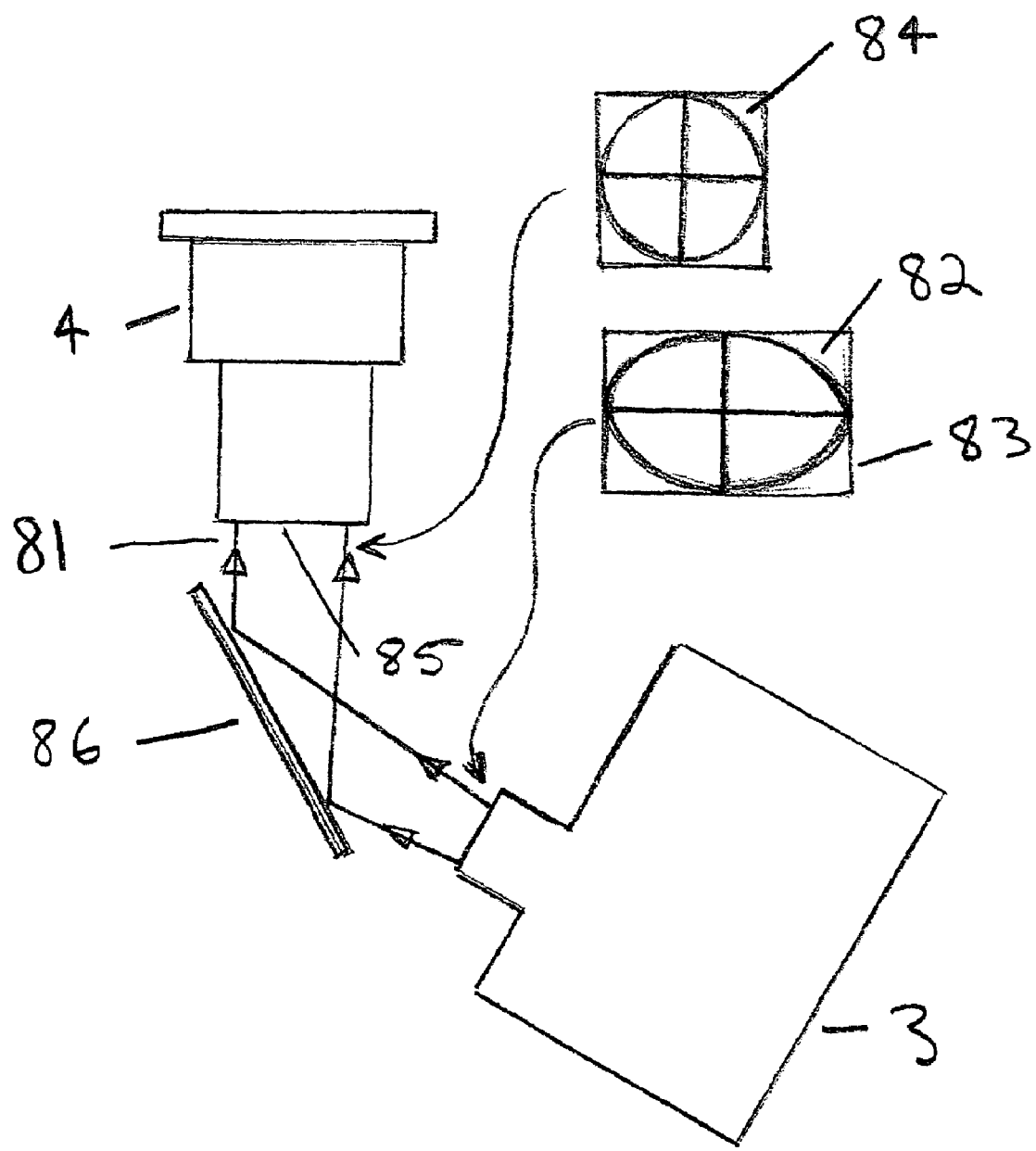
FIG. 8 is a diagram illustrating optical coordinate transformation.

FIG. 8 is a diagram illustrating optical coordinate transformation. It illustrates one simple example of how optical techniques can be utilized to take advantage of a greater portion of the projector's input display 83. For example, an oval 82 within the digital video projector's display 83 contains more information than a circle such as 72 in FIG. 7. Thus, if the oval 82 can be mapped to a circular shape 84 for input to the lens system 4, the resulting display will also have more resolution. This can be achieved at the lens system's aperture 85 by utilizing a mirror 86 that is not at a 45 degree angle to the light path. Other optical designs are possible in order to take greater advantage of the pixels that are available in an electronically controlled rectangular display.

This technique can also be used to produce an image on the display surface that has a different linear pixel density across longitudes versus across latitudes as may be advantageous in certain applications. For example, in the case of a spheroid display surface, it may be advantageous to have greater pixel resolution along an axis of its long dimension.

Figure 9A:
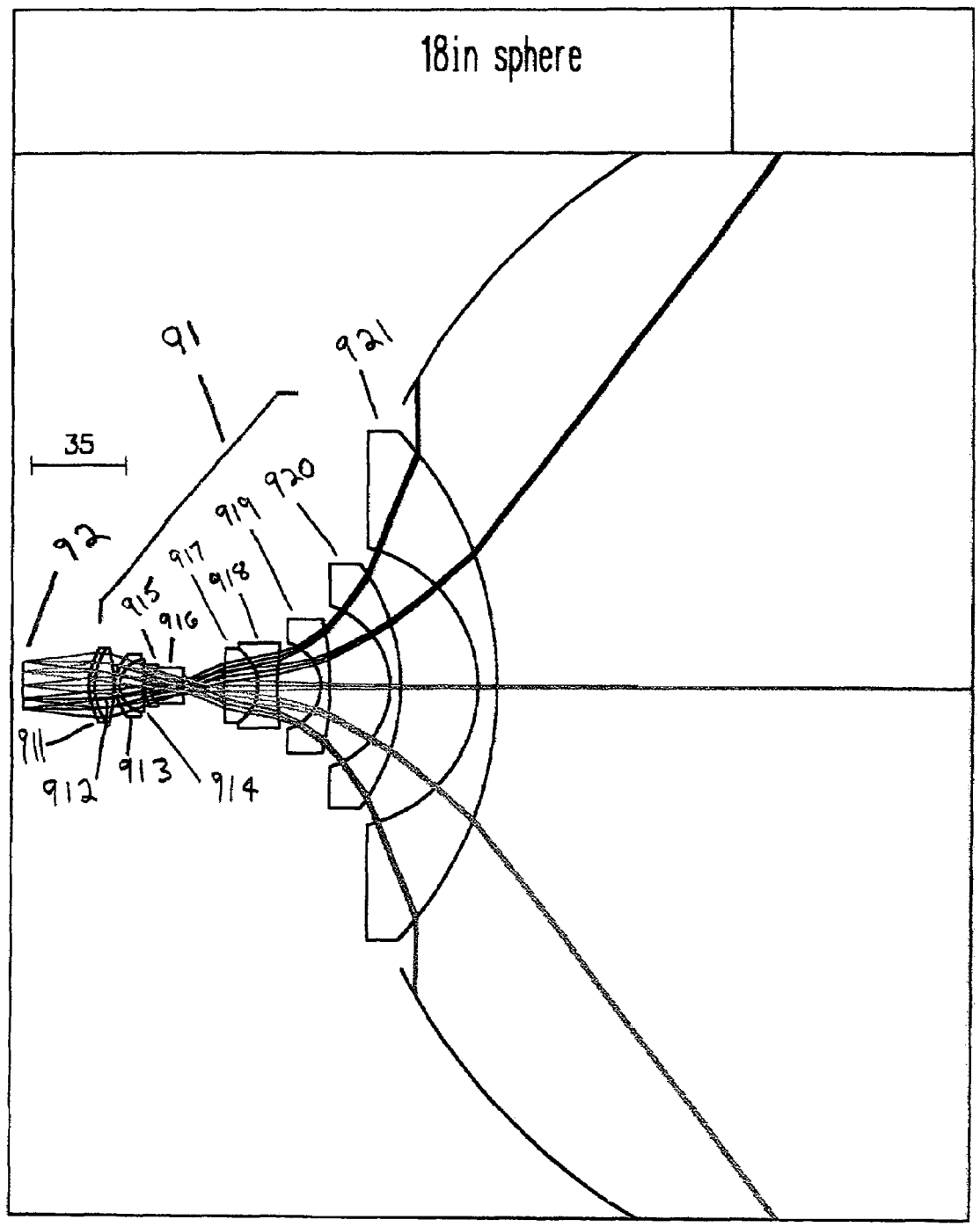
Figure 9C:
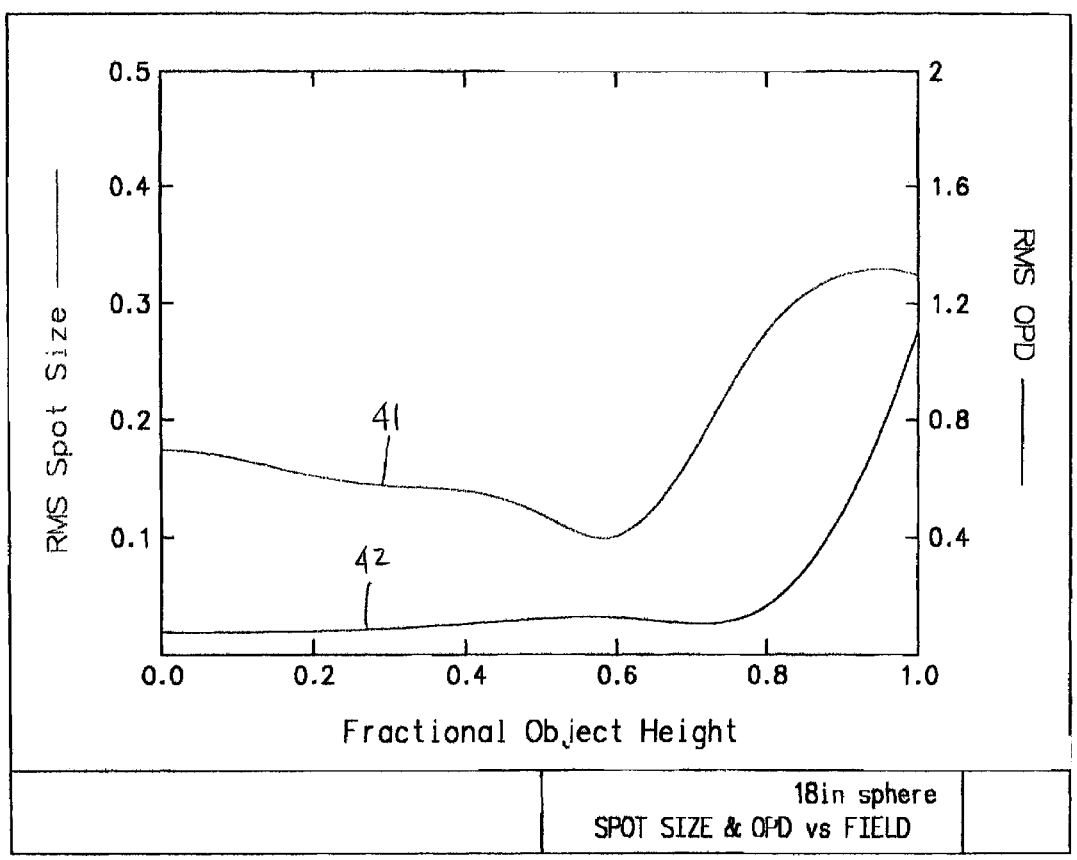

FIGS. 9A-9C are diagrams illustrating another embodiment of a projection system. In this approach, the optical train of the projection system does not have a lens system 4 that is added to a pre-existing projector 3. Rather, the projection lens system 91 in the projection system is designed as a single, integral unit. It images a flat object field onto the three-dimensional display surface.

FIG. 9A is a cross section of the lens system 91. The vertical line 92 at the left represents the object, for example an LCD display, slide, or the like. Elements 911 and 912 are cemented to form a doublet. Likewise, elements 913 and 914 form a second cemented doublet; elements 915 and 916 form a third cemented doublet, and elements 917 and 918 form a fourth doublet. The aperture stop of the lens system 91 lies slightly to the right of element 916.

The lens elements can roughly be divided into three lens groups by function: elements 911-912, elements 913-918, and elements 919-921. The central lens group, elements 913-918, form a nearly symmetric conventional imaging lens. That is, in the absence of lens group 911-912 on the left and lens group 919-921 on the right, the lens group 913-918, with minor changes to curvature, thickness, and spacing, would be able to create a well-corrected image to their right, of an object plane to their left. This is because of the nearly symmetric layout, with generally positive elements symmetrically deployed on each side of the aperture stop.

The doublet 911-912 has the primary function of assuring telecentricity of the input light.

The final lens group 919-921 are strongly negative meniscus lens elements. The role of these elements is to widely deflect the projected light pencils so as to fill the interior of the spherical display surface. They play a role similar to lenses 325-327 in FIG. 3B. There are three such negative meniscus elements rather than, say, two, or one, because using more elements reduces the optical power required at each of the elements, and this reduced power at each element in turn reduces the aberrations, notably spherical aberration, induced by the elements. Likewise, the elements are deeply meniscus because that permits the magnitudes of the angles of refraction of the rays at the various surfaces to be reduced, and such reduction reduces the associated aberrations.

One of the serious optical aberrations that arise from such a series of three strong negative meniscus lens elements is negative spherical aberration. This negative spherical aberration has been compensated, in large part, by the positive optical powers provided by the other elements, 911-918. Another serious optical aberration that arises in any lens is chromatic aberration. To combat the chromatic aberration of the lens as a whole, the first eight elements are arranged in the form of four achromatic doublets, where negative, high-dispersion elements are combined with positive, low-dispersion elements to provide net reduction in the overall chromatic aberration of the lens. The result is that the chromatic aberration of the lens as a whole is substantially reduced.

This lens design utilizes only spherical lenses, and so the number of lenses is comparatively large. By utilizing one or more aspheres, a projection lens system with comparable optical performance, yet comprising fewer lenses, can be designed. This can be advantageous when production volumes are large.

FIG. 9B are tables of lens data for the projection lens system 91. FIG. 9C is a diagram of RMS spot radius 41 and RMS OPD 42 as a function of fractional object height for the projection lens 91 and an 18 inch diameter display surface.

The utility of an integral design is based, in part, upon the economics of manufacturing. If the production volume of the display system is small, it may be advantageous to use the separate configuration so as to leverage the high production volumes of the vendors who sell off-the-shelf projectors, as well as to leverage the price competitiveness of the projector market. On the other hand, when production volumes are large, it may be advantageous to use an integral design comprising a small number of lenses because there may be fewer overall parts to be manufactured and assembled and costs may be lower.

Figure 10:
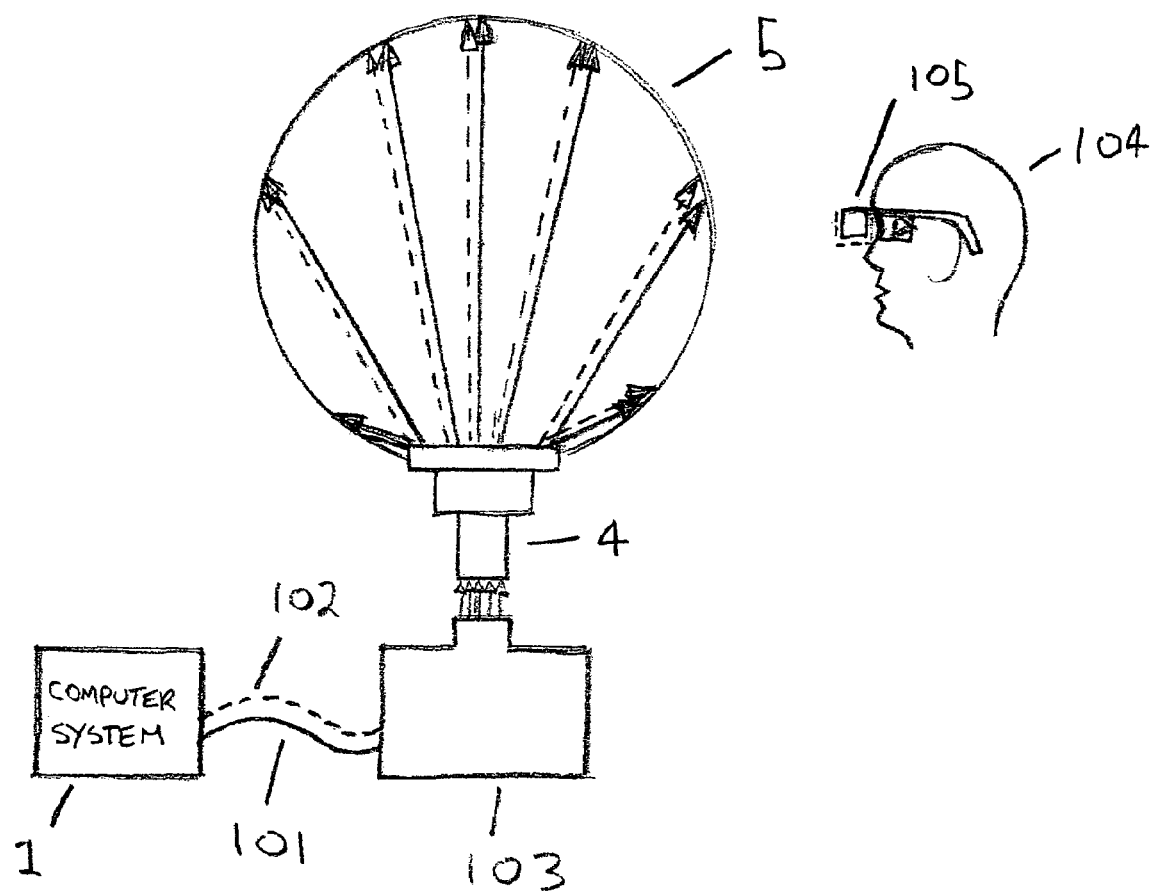
FIG. 10 is a diagram illustrating a stereoscopic version of a projection system according to the invention.

FIG. 10 shows another embodiment where the display projector 103 is stereoscopic, in order to create a stereoscopic image for the viewer. In this configuration, there are one or two video inputs 101 and 102 to the projection system 103 and the projection system may comprise one or two projectors. If the viewer is in a fixed position relative to the display surface 5, there are two fixed desired images, one for each eye. By utilizing the techniques described above, two different flat source images are created from the two different desired images, as stored by a computer system. The resulting flat source images are output for display by the stereoscopic projector. The viewer wears the eye-gear appropriate for the projector, such as polarized glasses for a polarizing stereoscopic projector.

If the viewer is not in a fixed position, a three-dimensional effect can be created if the viewer 104 is also wearing eye tracking device 105. The eye tracking device 105 is used to garner the viewer's position and direction of view, respectively. Well-known three-dimensional graphics techniques are used to create the desired image for each eye. As described previously, a flat source image is created for each eye, and subsequently is output by the computer system 1 for display by the stereoscopic projector 103.

Figure 11A:
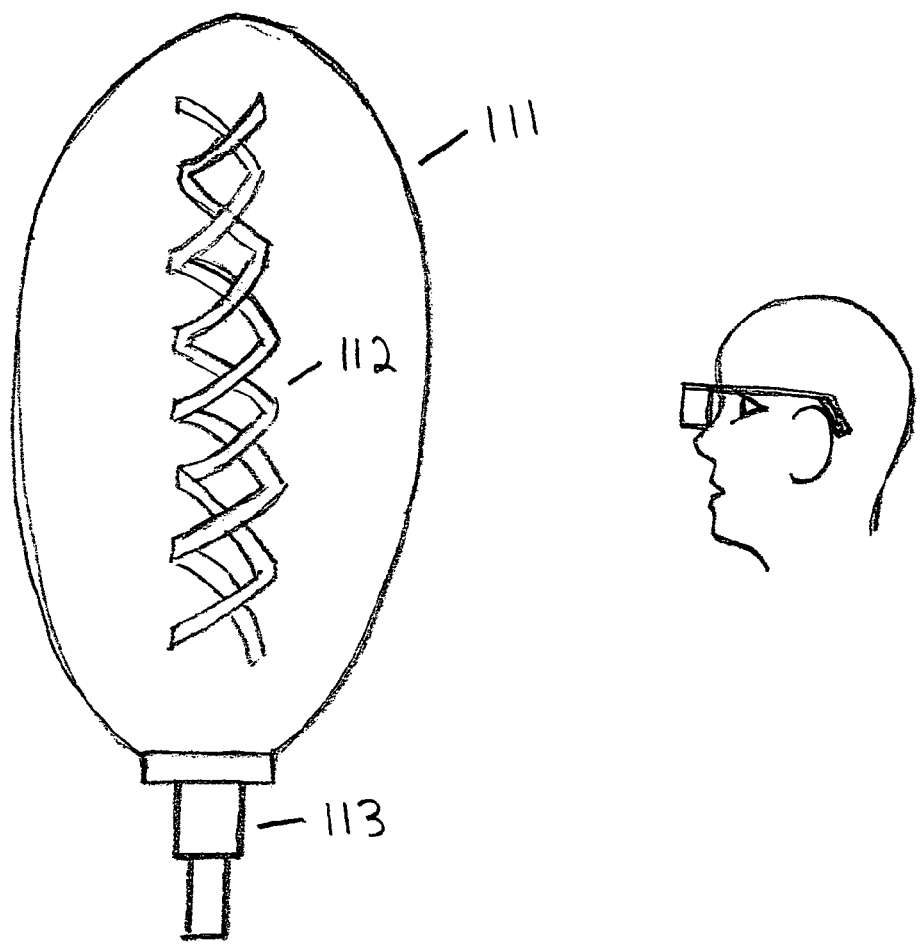
FIGS. 11A-11F are diagrams illustrating alternate shapes for the display surface.

FIGS. 11A-11F are diagrams illustrating alternate embodiments of the display surface 5. In FIG. 11A, the display surface 111 is a spheroid. An example application of where this shaped display surface may be preferable is an application where molecules 112, which may be much longer than they are wide, are to be displayed. In such a case, a display surface that is much longer than it is wide may be preferable. In FIG. 11A, 113 is the lens system.

Figure 11B:
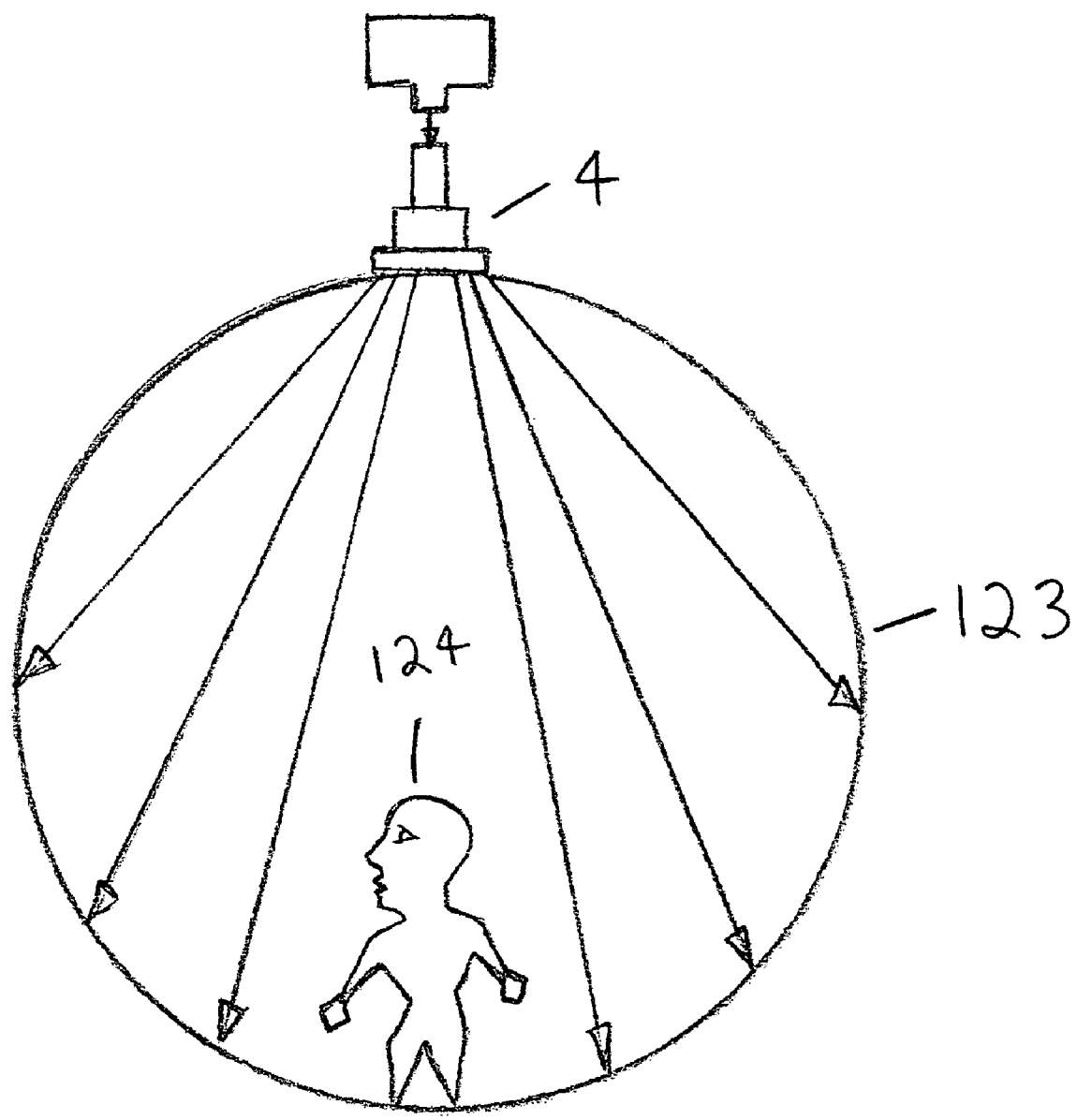
Figure 11C:
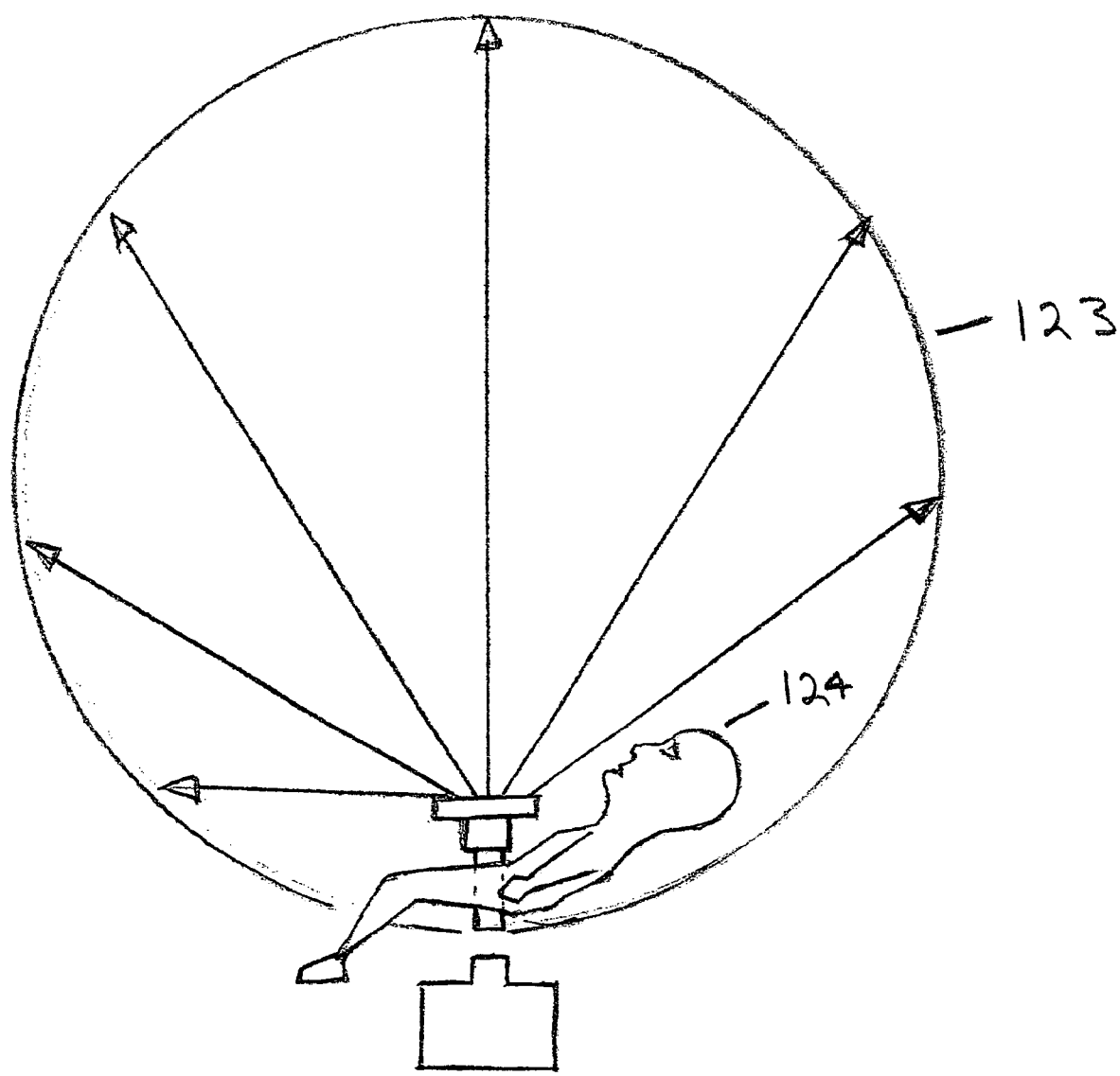

In FIGS. 11B and 11C, the display surface is a domed display surface 123 with the viewer 124 in different positions on the interior of the surface. In this embodiment, the display surface 123 is reflective rather than translucent. Example applications of where this shape and configuration of display surface may be preferable include planetary sciences, virtual reality immersion systems, and so on.

Figure 11D:
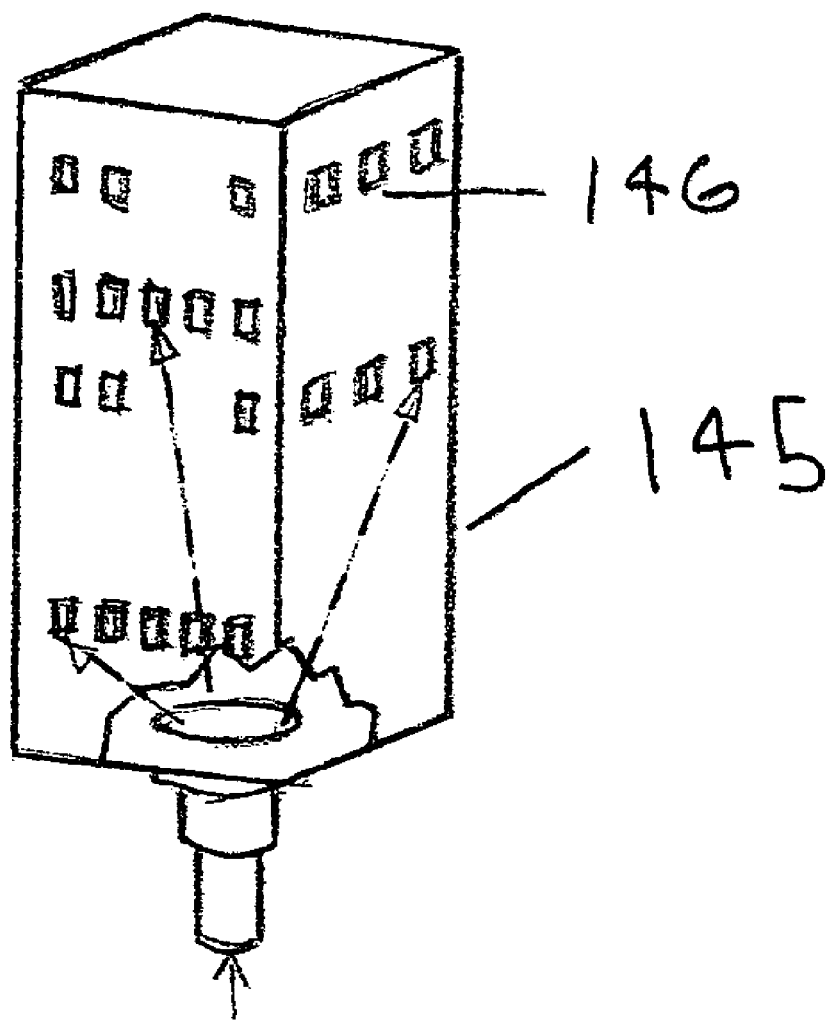

In FIG. 11D, the display surface is approximately in the shape of a rectangular solid 145. An example application of where this shape and configuration of display surface may be preferable is architectural applications where it may be desirable to visualize alternative facades for a building 146 prior to construction, or as a display in the lobby of the building after construction. This shape and configuration is but one example of where the display surface is shaped to match a physical object.

Figure 11E:
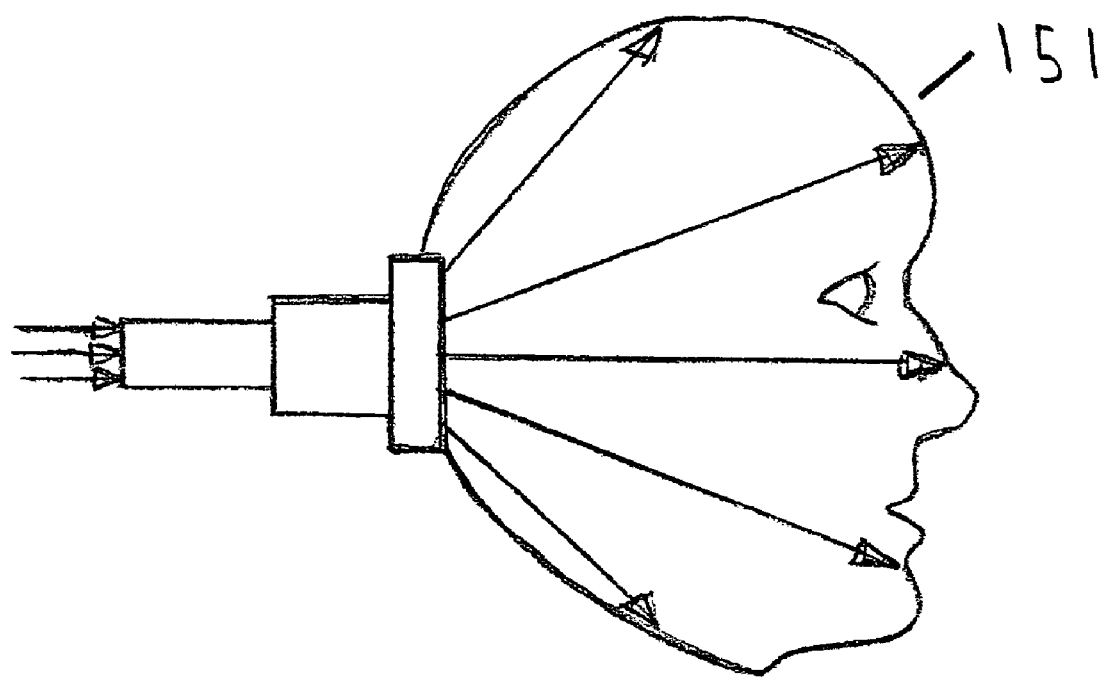

In FIG. 11E, the display surface is in the shape of a person's head 151. An example application of where this shape and configuration of display surface may be preferable is for special effects purposes in the entertainment industry. Note that the head shape may be modified slightly so that the display surface remains convex.

Figure 11F:
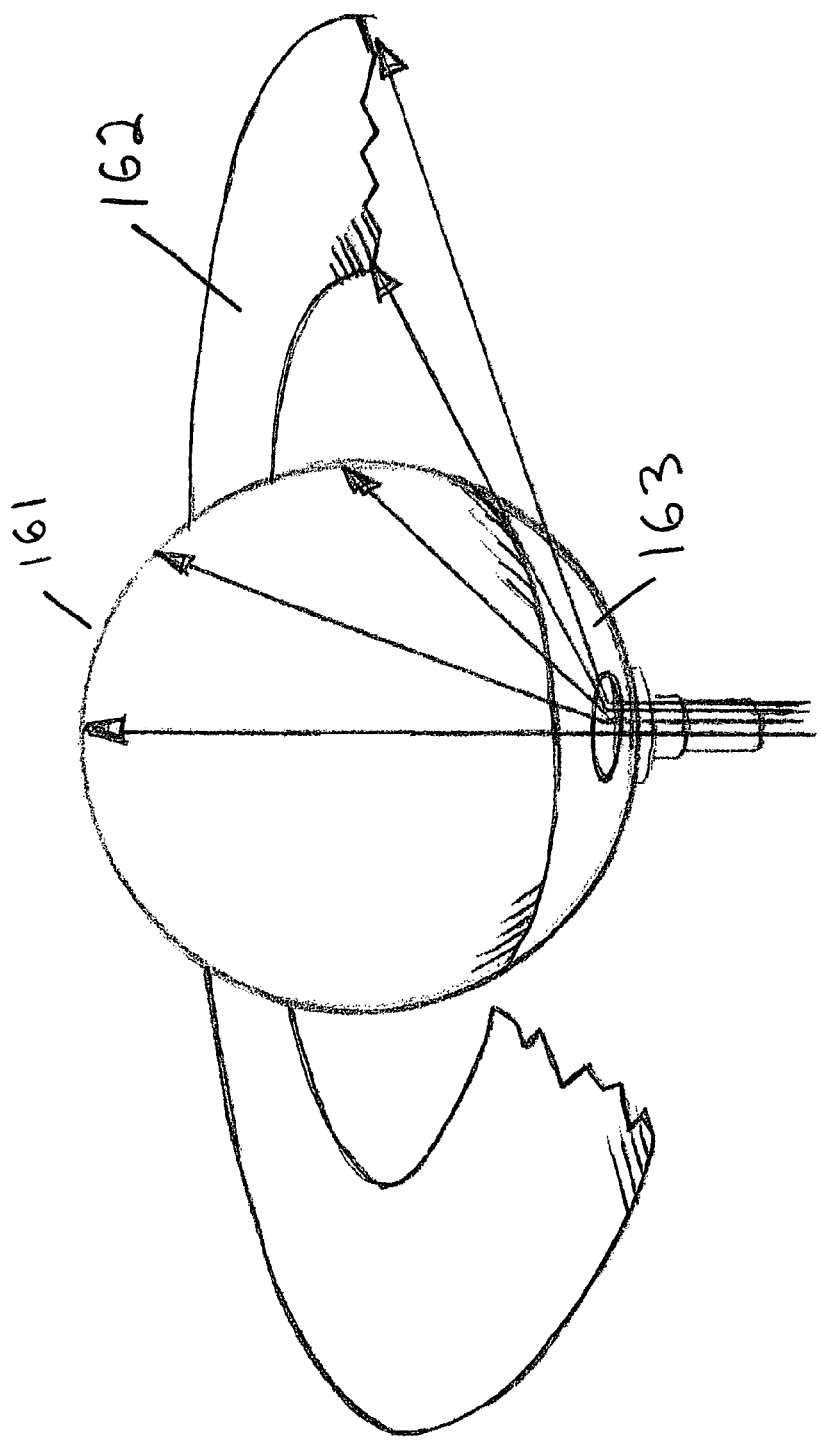

In FIG. 11F, the display surface is partially translucent 161 and partially transparent 163. In addition, there is a second translucent display surface 162. Light passes through the transparent portion 163 of the display surface and reaches the translucent display surface 162. An example of where a configuration such as this might be used is in the display of information related to the planet Saturn, where display surface 162 corresponds to Saturn's rings.

Note that, as shown in FIGS. 4A-4C, the projection system can accommodate a wide range of image distances without refocusing the system. In FIGS. 4A-4C, the display surfaces range in diameter from twelve to eighteen inches and all of these diameters remain in acceptable focus without having to refocus the projection system. Taking this one step further, one can imagine the region located between the twelve inch diameter sphere and the eighteen inch diameter sphere: All of the points located in this region are in acceptable focus. Thus, the projection system of FIG. 3, without refocusing, can be used with any convex shape that falls within this region. Furthermore, by varying the focus of the projector, the "in-focus" region can be further expanded, thereby further increasing the range of convex shapes that can be used. As a result, display systems with widely varying shapes of convex display surface can be designed.

Figure 12A:
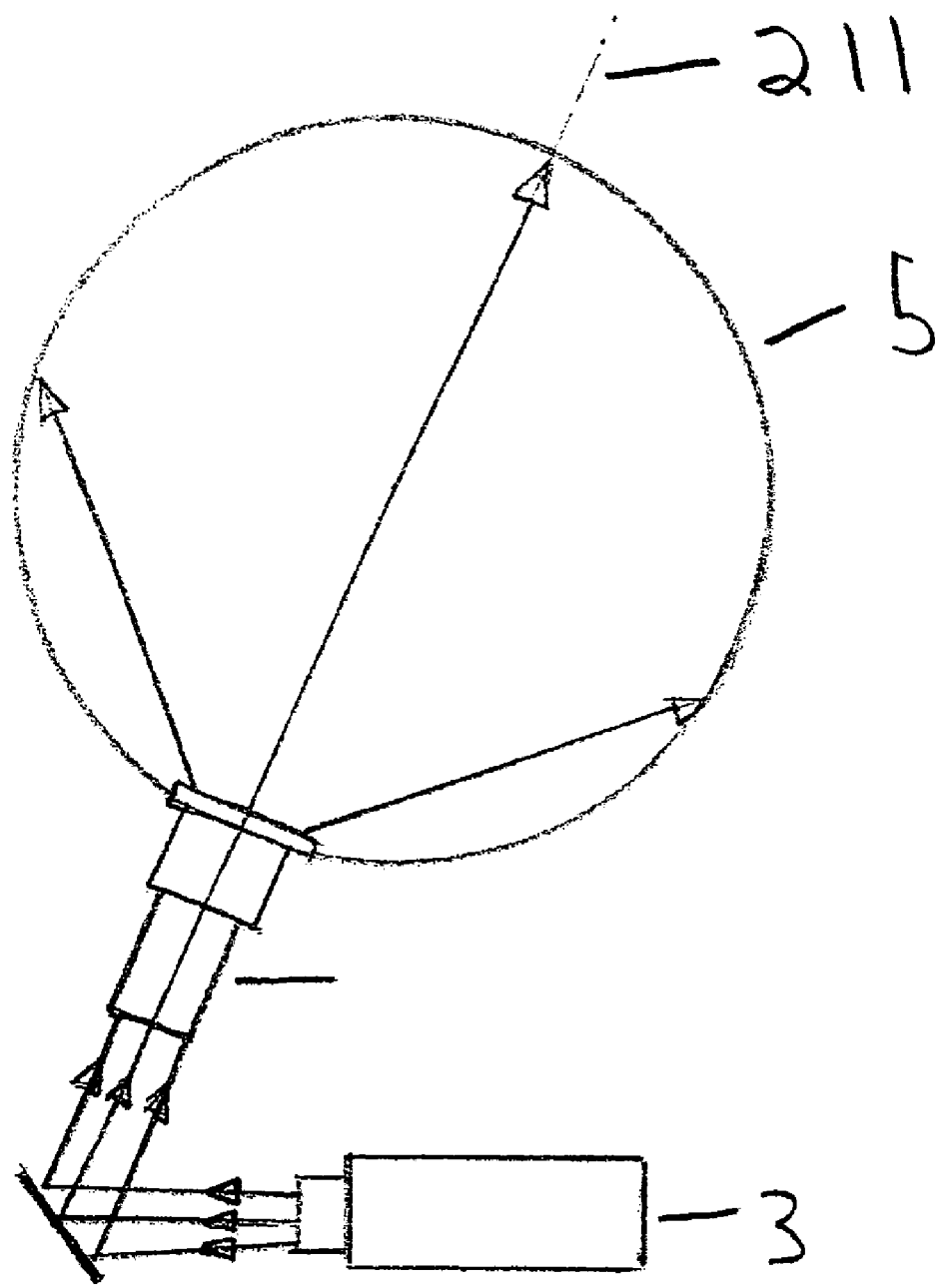
FIGS. 12A-12C are diagrams illustrating alternate embodiments of the display system.
Figure 12B:
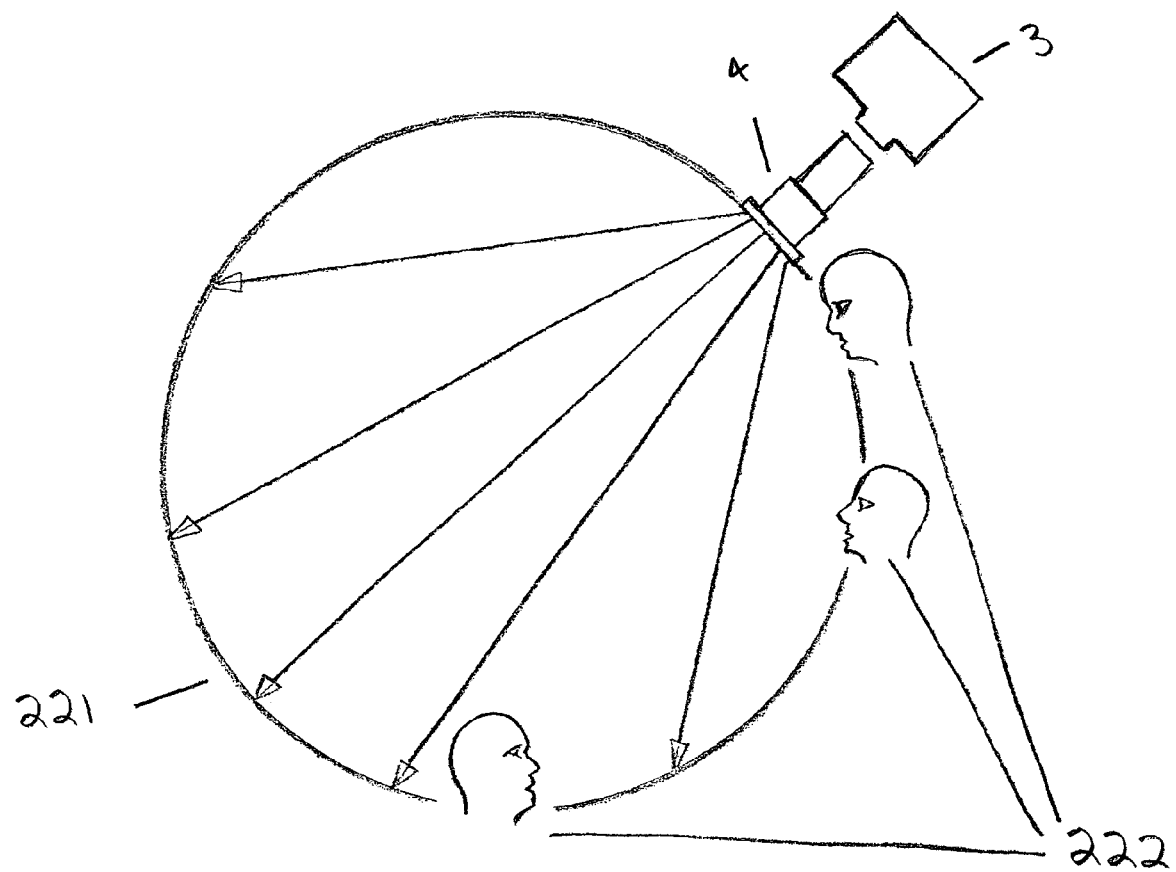
Figure 12C:
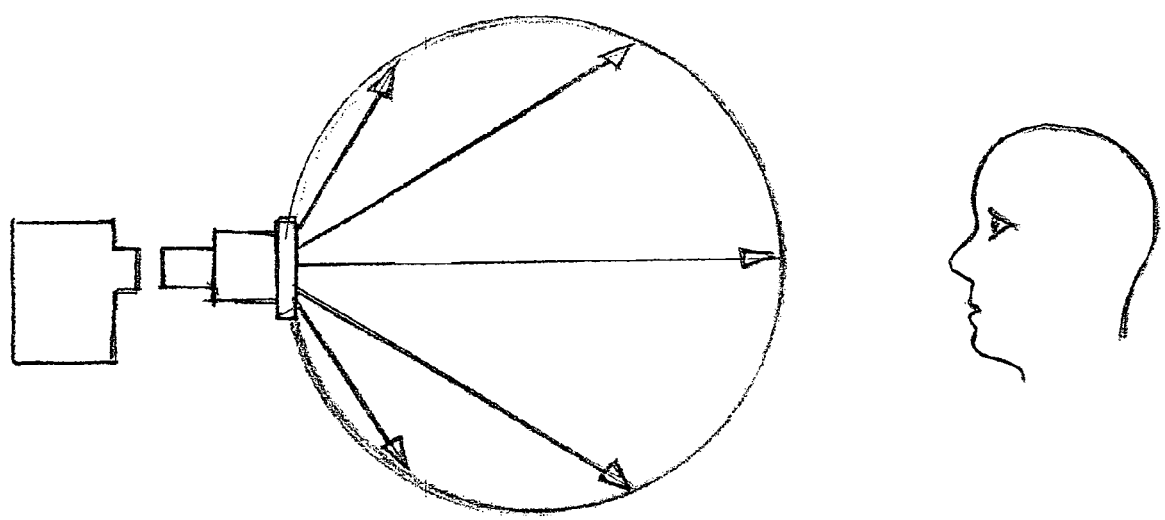

FIGS. 12A-12C are diagrams illustrating alternate embodiments of the display system. In FIG. 12A, the projector 3 projects horizontally rather than vertically, and the axis 211 of the display surface 5 is not vertical. A simple example of an application of this configuration is for use on a tabletop where it is desirable that the display system is of lower height, or in earth-sciences applications where it is desirable that the angle of the axis of the-display surface matches that of the earth relative to the sun.

In FIG. 12B, the projector 3 is at a different angle relative to the display surface 221, the configuration is immersive (i.e., the display surface is viewed from its interior), and a number of potential viewer locations are shown. The viewer 222 is interior to the display surface 221, and the display surface 221 is reflective rather than translucent. An example application of this configuration is in virtual reality simulation.

In FIG. 12C the display system is horizontal rather than vertical, as might be used in museum displays.

It will be well understood by those skilled in the art that various elements of potential configurations can be mixed and matched, including whether the projector-lens system combination is horizontal, vertical, above or below, or at different angles relative to the display surface; whether the projector is a slide projector, a movie projector, or a digital video projector, and whether it is stereoscopic or not; whether the projection lens system is implemented as a separate projector plus lens system or as an integral unit; whether the radius of the display sphere is small or large; whether the display surface is translucent or reflective, and of what materials it is made or coated; whether the viewer is interior to the display surface or not; whether the display surface is spherical or not; and so on.

Further, many other modifications and variations of the design are possible in light of the above teachings. Therefore, it is to be understood that, within the scope of the appended claims, the invention may be embodied otherwise than as specifically described above.

What is claimed is:

1. A display system comprising:
    a display surface having a three-dimensional convex shape; and
    a projection system for projecting an intermediate image at an object field, the intermediate image to be passed through a lens system, onto a continuous image field on an interior of the display surface, wherein the projection of the intermediate image on the continuous image field is substantially in focus on the interior of the display surface, and wherein a ratio of a longest image distance to a shortest image distance is at least 1.75, and an image distance at an apex image point is longer than an image distance at a full field image point.

2. The display system of claim 1 wherein the image field covers at least 240 degrees of the display surface.

3. The display system of claim 2 wherein the image field covers at least 300 degrees of the display surface.

4. The display system of claim 2 wherein the display surface is approximately spherical.

5. The display system of claim 4 wherein the display surface is translucent.

6. The display system of claim 2 wherein the display surface includes an aperture, and the image field covers substantially the entire interior of the display surface exclusive of the aperture.

7. The display system of claim 6 further comprising:
a physical support for the display surface, wherein the physical support hides the aperture from view.

8. The display system of claim 6 wherein the projection system has an optical axis that enters the interior of the display surface via the aperture.

9. The display system of claim 8 wherein the optical axis is tilted relative to vertical.

10. The display system of claim 2 wherein the projection system comprises:
a lens system for projecting a virtual object field onto the continuous image field on the interior of the display surface.

11. The display system of claim 10 wherein the projection system further comprises:
a projector optically coupled to the lens system, the projector for projecting the object field onto a flat image field, wherein the object field for the projector is flat and the flat image field for the projector serves as the virtual object field for the lens system.

12. The display system of claim 11 wherein the projector comprises a digital video projector.

13. The display system of claim 11 wherein the projector comprises a slide projector.

14. The display system of claim 11 wherein the projector comprises a movie projector.

15. The display system of claim 11 wherein the projector comprises a projection television.

16. The display system of claim 10 wherein the virtual object field is generated by a projector and the lens system is adapted to be mechanically attached to the projector.

17. The display system of claim 10 wherein the projection system can accommodate display surfaces of varying size by varying a focus of the projector.

18. The display system of claim 2 wherein the display surface comprises multiple materials.

19. The display system of claim 2 wherein the display surface is seamless.

20. The display system of claim 2 wherein the image field is axially asymmetric about an optical axis.

21. The display system of claim 2 wherein the object field is non-circular.

22. The display system of claim 2 wherein the projection system comprises:
a projector that further comprises an integral projection lens system that projects the object field onto the continuous image field on the interior of the display surface, wherein the object field is flat.

23. The display system of claim 22 wherein the object field is flat and an object in the object field includes an electronically controlled display.

24. The display system of claim 22 wherein the object field is flat and an object in the object field includes a film-based display.

25. The display system of claim 2 wherein the display surface is spheroid in shape.

26. The display system of claim 2 wherein the interior of the display surface is reflective.

27. The display system of claim 2 wherein the display surface is approximately in a shape of a rectangular solid.

28. The display system of claim 2 wherein the projection system generates an image suitable for stereoscopic display.

29. The display system of claim 1 wherein the projection system comprises:
a lens system for projecting the object field onto the continuous image field, wherein the object field is a virtual, flat object field, and the image field is a continuous image field having a three-dimensional convex shape with a ratio of a longest image distance to a shortest image distance is at least 1.75, and an image distance at an apex image point is longer than an image distance at a full field image point.

30. The display system of claim 29 wherein the image field covers at least 240 degrees of the three-dimensional convex shape.

31. The display system of claim 30 wherein the image field covers at least 300 degrees of the three-dimensional convex shape.

32. The display system of claim 30 wherein the image field is substantially closed around a last clear surface of the lens system.

33. The display system of claim 30 wherein the image field is approximately spherical.

34. The display system of claim 30 wherein ray bundles destined for a full-field image point exit a last clear surface of the lens system at an angle that is substantially perpendicular to an optical axis of the lens system.

35. The display system of claim 30 wherein the lens system comprises:
a lens group for correcting chromatic aberration.

36. The display system of claim 30 wherein the lens system comprises:
at least one aspheric surface.

37. The display system of claim 36 wherein the at least one aspheric surface significantly changes an image distance to an image point, as a function of field height of the image point.

38. The display system of claim 37 wherein, on the aspheric surface, a footprint of a ray bundle destined for the apex image point does not overlap with a footprint of a ray bundle destined for the full field image point.

39. The display system of claim 30 wherein the lens system comprises:
a lens group with negative power for increasing an exit angle between an optical axis of the lens system and a ray destined for an image point, as a field height of the image point increases.

40. The display system of claim 39 wherein, within the lens group, a footprint of a ray bundle destined for the apex image point does not overlap with a footprint of a ray bundle destined for the full field image point.

41. The display system of claim 39 wherein lenses in the lens group have a flat surface around their rims so that the lenses are properly positioned when the flat surfaces contact each other.

42. The display system of claim 30 wherein the lens system comprises, in the following order along an optical axis:
a first lens group located close to an aperture of the lens system, the first lens group correcting for chromatic aberration;

a second lens group that includes an aspheric surface, for significantly changing an image distance to an image point as a function of field height of the image point; and a third lens group with negative power for increasing an exit angle between the optical axis and a ray destined for an image point, as a field height of the image point increases, wherein the second lens group acts as a partial field lens between the first lens group and the third lens group.

43. The display system of claim 30 wherein the object field is asymmetric about an optical axis of the lens system.

* * * * *

UNITED STATES PATENT AND TRADEMARK OFFICE
CERTIFICATE OF CORRECTION

| | | |
|---|---|---|
| PATENT NO. | : 7,352,340 B2 | Page 1 of 1 |
| APPLICATION NO. | : 10/613449 | |
| DATED | : April 1, 2008 | |
| INVENTOR(S) | : Steven W. Utt, Philip C. Rubesin and Michael A. Foody | |

It is certified that error appears in the above-identified patent and that said Letters Patent is hereby corrected as shown below:

Title Page, item (57), line 4; replace "surface the" with --surface. The--

Title Page, item (57), line 6, add --than-- between "greater hemispherical"

Signed and Sealed this

Fifteenth Day of July, 2008

JON W. DUDAS
*Director of the United States Patent and Trademark Office*